US012415258B2

(12) United States Patent
McClung et al.

(10) Patent No.: US 12,415,258 B2
(45) Date of Patent: *Sep. 16, 2025

(54) IMPACT WRENCH HAVING DYNAMICALLY TUNED DRIVE COMPONENTS AND METHOD THEREOF

(71) Applicant: Ingersoll-Rand Industrial U.S., Inc., Davidson, NC (US)

(72) Inventors: Mark T. McClung, Annadale, NJ (US); Timothy R. Cooper, Titusville, NJ (US); Warren A. Seith, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,561

(22) Filed: Nov. 14, 2023

(65) Prior Publication Data

US 2024/0082997 A1 Mar. 14, 2024

Related U.S. Application Data

(63) Continuation of application No. 16/590,296, filed on Oct. 1, 2019, now Pat. No. 11,992,921, which is a (Continued)

(51) Int. Cl.

*B25B 21/02* (2006.01)
*B25B 13/06* (2006.01)
*B25B 23/00* (2006.01)

(52) U.S. Cl.

CPC .......... *B25B 23/0035* (2013.01); *B25B 13/06* (2013.01); *B25B 21/02* (2013.01); *B25B 21/026* (2013.01)

(58) Field of Classification Search

CPC ..... B25B 21/02; B25B 13/06; B25B 23/0035; B25B 21/026

(Continued)

(56) References Cited

U.S. PATENT DOCUMENTS

| | | | | |
|---|---|---|---|---|
| 881,075 A * | 3/1908 | Hosking | B23G 1/46 279/157 |
| 881,856 A | 3/1908 | Hagstrom et al. | |

(Continued)

FOREIGN PATENT DOCUMENTS

| | | | |
|---|---|---|---|
| CA | 3211071 A1 * | 9/2022 | A61B 17/1624 |
| CA | 2934325 C * | 10/2023 | B25B 13/06 |

(Continued)

OTHER PUBLICATIONS

Office Action for Chinese Patent Application No. CN201280016835.5, dated Dec. 31, 2014.

(Continued)

*Primary Examiner* — Robert F Long
(74) *Attorney, Agent, or Firm* — Kevin E. West; Advent, LLP

(57) ABSTRACT

The present invention provides methods and systems an impact wrench having dynamically tuned drive components, such as an anvil/socket combination, and related methodology for dynamically tuning the drive components in view of inertia displacement, as well as stiffness between coupled components, and with regard to impact timing associated with clearance gaps between the component parts.

18 Claims, 32 Drawing Sheets

Related U.S. Application Data continuation of application No. 15/290,957, filed on Oct. 11, 2016, now Pat. No. 10,427,277, which is a continuation-in-part of application No. 14/169,945, filed on Jan. 31, 2014, now Pat. No. 9,463,557, and a continuation-in-part of application No. 14/169,999, filed on Jan. 31, 2014, now Pat. No. 9,469,017, and a continuation-in-part of application No. 13/080,030, filed on Apr. 5, 2011, now Pat. No. 9,566,692.

(58) Field of Classification Search
USPC ..... 173/1, 2, 93, 176, 179, 183, 217; 81/464
See application file for complete search history.

(56) References Cited

U.S. PATENT DOCUMENTS 1,222,996 A 4/1917 Rhodes
1,592,183 A 7/1926 De Roy
2,160,150 A 5/1939 Jimerson et al.
2,301,860 A 11/1942 Doane
2,608,444 A 8/1952 Ronfeldt
2,684,738 A * 7/1954 Kaplan ................ B25B 21/026 173/93.5
2,822,677 A 2/1958 Reynolds
2,969,660 A 1/1961 Dale et al.
3,180,435 A 4/1965 Mchenry
3,205,721 A 9/1965 Speer
3,354,757 A 11/1967 Grimm et al.
3,363,699 A * 1/1968 Maffey, Jr. ............. B25B 21/02 173/93.5
3,583,821 A 6/1971 Shaub et al.
3,592,087 A 7/1971 Pauley
3,675,516 A 7/1972 Knudsen et al.
3,710,873 A 1/1973 Allen
3,741,313 A 6/1973 States
3,744,350 A 7/1973 Raff
3,823,624 A 7/1974 Martin
3,859,821 A 1/1975 Wallace
3,881,215 A 5/1975 Krier et al.
3,881,838 A 5/1975 Derbyshire
3,982,419 A 9/1976 Boys
4,002,078 A 1/1977 Thomas
4,058,132 A 11/1977 Dietz
4,068,377 A 1/1978 Kimmel et al.
4,075,927 A 2/1978 Frazier
4,098,354 A 7/1978 Alcenius
4,129,240 A 12/1978 Geist
4,157,120 A 6/1979 Anderson
4,166,507 A 9/1979 Bouyoucos et al.
4,169,366 A 10/1979 Ames
4,182,781 A 1/1980 Hooper et al.
4,204,622 A 5/1980 Smith et al.
4,213,621 A 7/1980 Fink et al.
4,287,956 A 9/1981 Maurer
4,298,505 A 11/1981 Dorfeld et al.
4,313,338 A 2/1982 Abe et al.
4,323,127 A 4/1982 Cunningham
4,341,001 A 7/1982 Swartout
4,485,682 A 12/1984 Stroezel et al.
4,519,535 A 5/1985 Crutcher
4,541,160 A 9/1985 Roberts
4,561,507 A 12/1985 Liou
4,591,821 A 5/1986 Paulson et al.
4,671,141 A * 6/1987 Hanson ................ B25B 13/065 81/53.2
4,708,209 A 11/1987 Aspinwall
4,792,065 A 12/1988 Soehnlein et al.
4,800,786 A 1/1989 Arnold et al.
4,836,059 A 6/1989 Arnold
4,849,047 A 7/1989 Ferguson
4,854,492 A 8/1989 Houck et al.
4,860,611 A 8/1989 Flanagan et al.
4,943,815 A 7/1990 Aldrich et al.
4,979,355 A 12/1990 Ulevich
4,991,472 A * 2/1991 Hollingsworth ........ B25B 21/02 81/464
5,037,260 A 8/1991 Rubin
5,102,271 A 4/1992 Hemmings
5,158,458 A * 10/1992 Perry .................... B25B 15/004 433/141
5,181,148 A 1/1993 Blanchette et al.
5,199,505 A 4/1993 Izumisawa
D338,146 S 8/1993 Gramera
5,235,313 A 8/1993 Narizuka et al.
5,310,341 A 5/1994 Byer
5,328,308 A 7/1994 Ducker, III et al.
5,361,851 A 11/1994 Fox
5,366,082 A 11/1994 Haytayan
5,375,637 A 12/1994 Matsumoto et al.
5,405,221 A 4/1995 Ducker, III et al.
5,432,644 A 7/1995 Tajima et al.
5,442,980 A 8/1995 Ringer
5,469,131 A 11/1995 Takahashi et al.
5,511,715 A 4/1996 Crutcher et al.
5,535,867 A 7/1996 Coccaro et al.
5,543,208 A 8/1996 Hasler
5,598,892 A 2/1997 Fox
5,624,150 A 4/1997 Venier
5,724,209 A 3/1998 Dunckley et al.
5,733,669 A 3/1998 Veyhl et al.
5,772,367 A 6/1998 Daniel
5,782,570 A 7/1998 Masterson et al.
5,794,325 A 8/1998 Fallandy
5,813,298 A 9/1998 Beattie
5,842,651 A 12/1998 Smothers
5,845,718 A 12/1998 Cooper et al.
5,848,655 A 12/1998 Cooper et al.
5,862,658 A 1/1999 Howard
5,881,940 A 3/1999 Almeras et al.
5,906,149 A 5/1999 Montenegro Criado
5,910,197 A 6/1999 Chaconas
5,957,012 A 9/1999 McCune
5,984,020 A 11/1999 Meyer et al.
5,992,538 A 11/1999 Marcengill et al.
5,994,996 A 11/1999 Van Den Broek et al.
6,000,310 A 12/1999 Shilkrut et al.
6,045,141 A 4/2000 Miles et al.
D425,385 S 5/2000 Mckay
6,098,726 A 8/2000 Taylor et al.
6,120,220 A 9/2000 Speare
6,161,627 A 12/2000 Seith et al.
6,196,332 B1 3/2001 Albert et al.
6,202,968 B1 3/2001 Lehr
6,321,625 B1 11/2001 Fernandez
6,328,505 B1 12/2001 Gibble
6,347,668 B1 2/2002 McNeill
6,427,564 B1 8/2002 Nelson
6,463,824 B1 10/2002 Prell et al.
6,517,408 B1 2/2003 Rehkemper et al.
6,575,057 B1 6/2003 Ploeger
6,581,697 B1 6/2003 Giardino
6,698,315 B1 3/2004 Wright
6,698,316 B1 3/2004 Wright
6,863,134 B2 3/2005 Seith et al.
6,913,613 B2 7/2005 Schwarz et al.
6,923,348 B2 8/2005 Grach et al.
7,025,149 B2 * 4/2006 Pusateri ............... B25D 17/005 173/104
7,127,969 B2 10/2006 Hsieh
7,153,214 B2 12/2006 Delaney et al.
7,159,491 B1 1/2007 Chaconas et al.
7,243,923 B2 7/2007 Campbell et al.
D573,165 S 7/2008 Grundvig
7,395,871 B2 7/2008 Carrier et al.
7,484,440 B2 2/2009 Wright
7,563,061 B2 7/2009 Gibbons et al.
7,625,209 B2 12/2009 Wade
7,987,748 B2 8/2011 Chiu
7,997,169 B1 8/2011 Hack
8,109,183 B2 2/2012 Santamarina et al.
8,132,990 B2 3/2012 Bauman
8,210,409 B2 7/2012 Hirabayashi
8,220,366 B1 7/2012 Fierro et al.

(56) References Cited

U.S. PATENT DOCUMENTS

| | | | |
|---|---|---|---|
| 8,388,276 B2 | 3/2013 | Jaillon et al. | |
| 8,534,527 B2 | 9/2013 | Brendel et al. | |
| 8,564,148 B1 | 10/2013 | Novak | |
| 8,727,660 B2 | 5/2014 | Anderegg et al. | |
| 8,840,344 B2 | 9/2014 | Stenman | |
| 9,144,891 B2 | 9/2015 | Khangar et al. | |
| 9,463,557 B2 | 10/2016 | Seith et al. | |
| 9,469,017 B2 | 10/2016 | Seith et al. | |
| 9,566,692 B2 | 2/2017 | Seith et al. | |
| 10,953,438 B2 | 3/2021 | Persson et al. | |
| 2001/0024865 A1 | 9/2001 | Kretschmann et al. | |
| 2002/0071235 A1 | 6/2002 | Gorczyca et al. | |
| 2002/0185288 A1 | 12/2002 | Hanke et al. | |
| 2003/0010511 A1 | 1/2003 | Hecht | |
| 2003/0154703 A1 | 8/2003 | Lawrence | |
| 2003/0163924 A1 | 9/2003 | Hempe et al. | |
| 2004/0074344 A1 | 4/2004 | Carroll | |
| 2004/0182587 A1 | 9/2004 | May et al. | |
| 2004/0194772 A1 | 10/2004 | Hamilton | |
| 2004/0240954 A1 | 12/2004 | Chilcott | |
| 2005/0016333 A1 | 1/2005 | Compton | |
| 2005/0087336 A1 | 4/2005 | Surjaatmadja et al. | |
| 2005/0135890 A1 | 6/2005 | Bauman | |
| 2005/0140241 A1 | 6/2005 | Petersen | |
| 2005/0218185 A1 | 10/2005 | Kenney et al. | |
| 2006/0006976 A1 | 1/2006 | Bruno | |
| 2006/0078438 A1 | 4/2006 | Wood | |
| 2006/0108890 A1 | 5/2006 | Hauger et al. | |
| 2006/0124331 A1 | 6/2006 | Stirm et al. | |
| 2006/0175773 A1 | 8/2006 | Tsai et al. | |
| 2006/0225540 A1 | 10/2006 | Tsai et al. | |
| 2006/0250029 A1 | 11/2006 | Kelly et al. | |
| 2006/0257220 A1 | 11/2006 | Gertner | |
| 2006/0261125 A1 | 11/2006 | Schiestl | |
| 2006/0266537 A1 | 11/2006 | Izumisawa | |
| 2007/0142188 A1 | 6/2007 | Lien | |
| 2007/0289760 A1 | 12/2007 | Sterling et al. | |
| 2008/0073094 A1 | 3/2008 | Lu | |
| 2008/0099217 A1 | 5/2008 | Seith et al. | |
| 2008/0107492 A1 | 5/2008 | Wiker et al. | |
| 2009/0014193 A1 | 1/2009 | Barezzani et al. | |
| 2009/0038816 A1 | 2/2009 | Johnson et al. | |
| 2009/0084567 A1 | 4/2009 | Basham et al. | |
| 2009/0101376 A1 | 4/2009 | Walker et al. | |
| 2009/0301269 A1 | 12/2009 | Wedge | |
| 2009/0321098 A1 | 12/2009 | Hull et al. | |
| 2010/0000749 A1 | 1/2010 | Andel | |
| 2010/0000750 A1 | 1/2010 | Andel | |
| 2010/0069205 A1 | 3/2010 | Lee et al. | |
| 2010/0096155 A1 | 4/2010 | Iwata et al. | |
| 2010/0123359 A1 | 5/2010 | Nishikawa | |
| 2010/0162579 A1 | 7/2010 | Naughton et al. | |
| 2010/0213236 A1 | 8/2010 | Zhang et al. | |
| 2010/0294086 A1 | 11/2010 | Gay et al. | |
| 2011/0030984 A1 | 2/2011 | Chen | |
| 2011/0036605 A1 | 2/2011 | Leong et al. | |
| 2011/0056337 A1 | 3/2011 | Buchanan | |
| 2011/0056714 A1 | 3/2011 | Elger et al. | |
| 2011/0109092 A1 | 5/2011 | Echemendia | |
| 2011/0186316 A1 | 8/2011 | Barhitte et al. | |
| 2012/0040802 A1 | 2/2012 | Dibble et al. | |
| 2012/0132452 A1 | 5/2012 | Hoop et al. | |
| 2012/0152067 A1 | 6/2012 | Yoshimachi et al. | |
| 2012/0170246 A1 | 7/2012 | Huang | |
| 2012/0234572 A1 | 9/2012 | Krätzig et al. | |
| 2012/0255403 A1 | 10/2012 | Ehlers et al. | |
| 2012/0255749 A1 | 10/2012 | Seith et al. | |
| 2012/0279736 A1 | 11/2012 | Tanimoto et al. | |
| 2012/0318550 A1 | 12/2012 | Tanimoto et al. | |
| 2013/0030436 A1 | 1/2013 | LeCronier et al. | |
| 2013/0062088 A1 | 3/2013 | Mashiko et al. | |
| 2013/0112448 A1 | 5/2013 | Profunser et al. | |
| 2013/0154202 A1 | 6/2013 | Low et al. | |
| 2013/0186663 A1 | 7/2013 | Zhou | |
| 2013/0192432 A1 | 8/2013 | Barker | |
| 2013/0205571 A1 | 8/2013 | Fanourgiakis et al. | |
| 2013/0264087 A1 | 10/2013 | Harada et al. | |
| 2013/0273792 A1 | 10/2013 | Davis et al. | |
| 2013/0277065 A1 | 10/2013 | Hallundbæk | |
| 2014/0110160 A1 | 4/2014 | Banba et al. | |
| 2014/0217737 A1 | 8/2014 | Egaña Castillo | |
| 2014/0231116 A1 | 8/2014 | Pollock et al. | |
| 2015/0096776 A1 | 4/2015 | Garber | |
| 2015/0217431 A1 | 8/2015 | Seith et al. | |
| 2015/0217433 A1 | 8/2015 | Seith et al. | |
| 2015/0231769 A1 | 8/2015 | Golden et al. | |
| 2015/0343618 A1 | 12/2015 | Wissling et al. | |
| 2016/0023341 A1 | 1/2016 | Gross et al. | |
| 2016/0023342 A1 | 1/2016 | Koenig et al. | |
| 2016/0221159 A1 | 8/2016 | Williams et al. | |
| 2017/0028537 A1 | 2/2017 | McClung et al. | |
| 2017/0106503 A1 | 4/2017 | Williams et al. | |
| 2017/0144278 A1 | 5/2017 | Nishikawa et al. | |
| 2017/0247060 A1 | 8/2017 | Jarvis et al. | |
| 2018/0361560 A1 | 12/2018 | Chen et al. | |
| 2020/0306845 A1* | 10/2020 | Kimura | F16D 1/101 |

FOREIGN PATENT DOCUMENTS

| | | | |
|---|---|---|---|
| CN | 1765589 | A | 5/2006 |
| DE | 940877 | C | 3/1956 |
| GB | 930816 | A | 7/1963 |
| GB | 2442299 | A | 4/2008 |
| GB | 2443399 | A | 5/2008 |
| JP | H06112613 | A | 4/1994 |
| JP | H1092602 | A | 4/1998 |
| JP | 2001318014 | A | 11/2001 |
| JP | 3674309 | B2 | 7/2005 |
| JP | 2005191206 | A | 7/2005 |
| JP | 2005294612 | A | 10/2005 |
| JP | 2006140296 | A | 6/2006 |
| JP | 2006313785 | A | 11/2006 |
| WO | 2011017066 | A1 | 2/2011 |
| WO | 2013002308 | A1 | 1/2013 |

OTHER PUBLICATIONS

Examination Report for European Application No. 17864349.0, dated Feb. 23, 2022.

Extended European Search Report from European Patent Application No. 12767994.2, dated May 26, 2015.

International Search Report and Written Opinion for PCT Application No. PCT/JP2015/072448, dated Oct. 27, 2015.

International Search Report and Written Opinion for PCT Application No. PCT/US2012/032116, dated Jun. 20, 2012.

International Search Report and Written Opinion for PCT Application No. PCT/US2017/055966, dated Dec. 28, 2017.

Office Action dated Jul. 29, 2015 from Chinese Patent Application No. CN201280016835.5 filed Apr. 4, 2012.

* cited by examiner

| TABLE 1<br>Component | Stiffness<br>*(in-lb/rad)* | Ratio $k_1/k_2$ *Target: 0.75* |
|---|---|---|
| 15/16" hex ($k_1$) | 335,000 | ------ |
| ½" air impact anvil ($k_2$) | 55,000 | 6.1 |
| ½" cordless anvil ($k_2$) | 80,000 | 4.2 |
| ½" square-shaped interface ($k_2$) | 274,000 | 1.2 |

*FIG. 16*

IMPACT WRENCH HAVING DYNAMICALLY TUNED DRIVE COMPONENTS AND METHOD THEREOF

CROSS-REFERENCE TO RELATED APPLICATIONS

This application claims the benefit of priority of each of the applications recited below and specifically claims the benefit of priority of and is a continuation of U.S. patent application Ser. No. 16/590,296 entitled IMPACT WRENCH HAVING DYNAMICALLY TUNED DRIVE COMPONENTS AND METHOD THEREOF, filed on Oct. 1, 2019, which is a continuation of U.S. patent application Ser. No. 15/290,957 entitled IMPACT WRENCH HAVING DYNAMICALLY TUNED DRIVE COMPONENTS AND METHOD THEREOF, filed on Oct. 11, 2016, which is a continuation-in-part of and claims the benefit of priority from U.S. patent application Ser. No. 13/080,030 entitled ROTARY IMPACT DEVICE and filed on Apr. 5, 2011, and which also claims the benefit of priority and is a continuation-in-part of U.S. patent application Ser. No. 14/169,945 entitled POWER SOCKET FOR AN IMPACT TOOL and filed on Jan. 31, 2014, and which also claims the benefit of priority and is a continuation-in-part of U.S. patent application Ser. No. 14/169,999 entitled ONE-PIECE POWER SOCKET FOR AN IMPACT TOOL and filed on Jan. 31, 2014. U.S. patent application Ser. No. 16/590,296, U.S. patent application Ser. No. 15/290,957, U.S. patent application Ser. No. 13/080,030, U.S. patent application Ser. No. 14/169,945, and U.S. patent application Ser. No. 14/169,999 are incorporated by reference herein in their entireties.

BACKGROUND

Technical Field

The following relates generally to an improved impact wrench, and more generally relates to an improved impact wrench having dynamically tuned drive components, such as an anvil socket combination and corresponding method of optimizing the characteristic functionality thereof.

State of the Art

Impact tools, such as an impact wrench, are well known in the art. An impact wrench is one in which an output shaft or anvil is struck by a rotating mass or hammer. The output shaft is typically coupled to a fastener engaging element, such as a socket, configured to connect with a fastener (e.g. bolt, screw, nut, etc.) to be tightened or loosened, and each strike of the hammer on the anvil applies torque to the fastener. Because of the nature of impact loading of an impact wrench compared to constant loading, such as a drill, an impact wrench can deliver higher torque to the fastener than a constant drive fastener driver.

Ordinarily, a socket is engaged with a polygonally-shaped mating portion of the anvil of an impact wrench, usually a square-shaped portion, and the socket is, in turn, coupled to a polygonally-shaped portion of a fastener, often having mating hex geometry. The socket commonly has a polygonal recess for receiving the polygonal portion of the fastener, thus resulting in a selectively secured mechanical connection. This connection or engagement of the socket to the fastener often affords some looseness allowing for ease of repeated and intended engagement and disengagement of the components because of tolerance clearances or gaps between the components, wherein the gaps can vary in dimension, possibly as a result of manufacturing variation, and affect the timing and/or a spring effect commonly associated with the transfer of energy from the socket to the fastener. Additionally, there is often also a spring effect between the ordinary square-shaped socket and anvil mating connection. Therefore, it is desirable to increase the amount of torque applied by the socket to overcome spring effect, to maximize energy transfer, to increase net effect, and to improve performance of the impact wrench.

SUMMARY

An aspect of the present disclosure includes an impact wrench comprising: a housing, configured to house a motor; a hammer, configured to be driven by the motor; an anvil configured to periodically engage the hammer as it is driven; and a socket having an interface configured to be removably coupled to a corresponding interface of the anvil, wherein the socket is further configured to engage a fastener; and wherein the anvil and socket are tuned and configured so that their combined stiffness, when removably coupled together including the interface between the two, is optimized so as to be between 1.15 and 1.45 times the stiffness of the fastener upon which the impact wrench is being used.

Another aspect of the present disclosure includes an impact wrench comprising: a housing, configured to house a motor and a hammer driven by the motor; an anvil configured to periodically engage the hammer as it is driven; and a socket removably coupled to the anvil, wherein the socket is further configured to engage a fastener; and wherein the anvil and socket are tuned and configured so that their combined inertia, when removably coupled together, is equal to the inertia of the hammer, thereby facilitating a hammer velocity of zero when the socket exerts peak force upon the fastener during tightening.

Still another aspect of the present disclosure includes an impact wrench comprising: a housing; a motor within the housing; a hammer driven by the motor; an anvil configured to engage the hammer; and a socket removably coupled to the anvil, wherein the socket is further configured to engage a fastener; and wherein the anvil and socket are dynamically tuned and configured so that the ratio of the inertia of the combined socket and anvil components and the inertia of the hammer has a specific relationship with the ratio of the anvil/socket combination stiffness and hex stiffness to achieve maximum output at a minimum total weight.

Yet another aspect of the present disclosure includes a method of dynamically tuning the drive components of an impact wrench, the method comprising: modifying the interface between an anvil and a socket so that the combined stiffness of the anvil and socket when coupled together is in the region of 4/3 the stiffness of the hex fastener on which the impact wrench is being used.

A further aspect of the present disclosure includes a method of dynamically tuning the drive components of an impact wrench, the method comprising: modifying the weight distribution of an anvil and a socket so that their combined inertia, when removably coupled together, is equal to the inertia of a hammer of the impact wrench, thereby facilitating a hammer velocity of zero when the socket exerts peak force upon the fastener during tightening.

Still a further aspect of the present disclosure includes a method of dynamically tuning the drive components of an impact wrench, the method comprising: equating the drive components of the impact wrench with springs and masses in a double oscillator model so that a hex fastener is equated with a first spring force, a socket is equated with a first inertial mass, an anvil is equated with a second spring force, and a hammer is equated with a second inertial mass; and tuning the anvil and socket so that the ratio of the inertia of the combined socket and anvil components and the inertia of the hammer has a specific relationship with the ratio of the anvil/socket combination stiffness and hex stiffness to achieve maximum output at a minimum total weight.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members:

FIG. 16 depicts a listing stiffnesses of interest and lab-measured ratios;

DETAILED DESCRIPTION OF EMBODIMENTS

Figure 1:
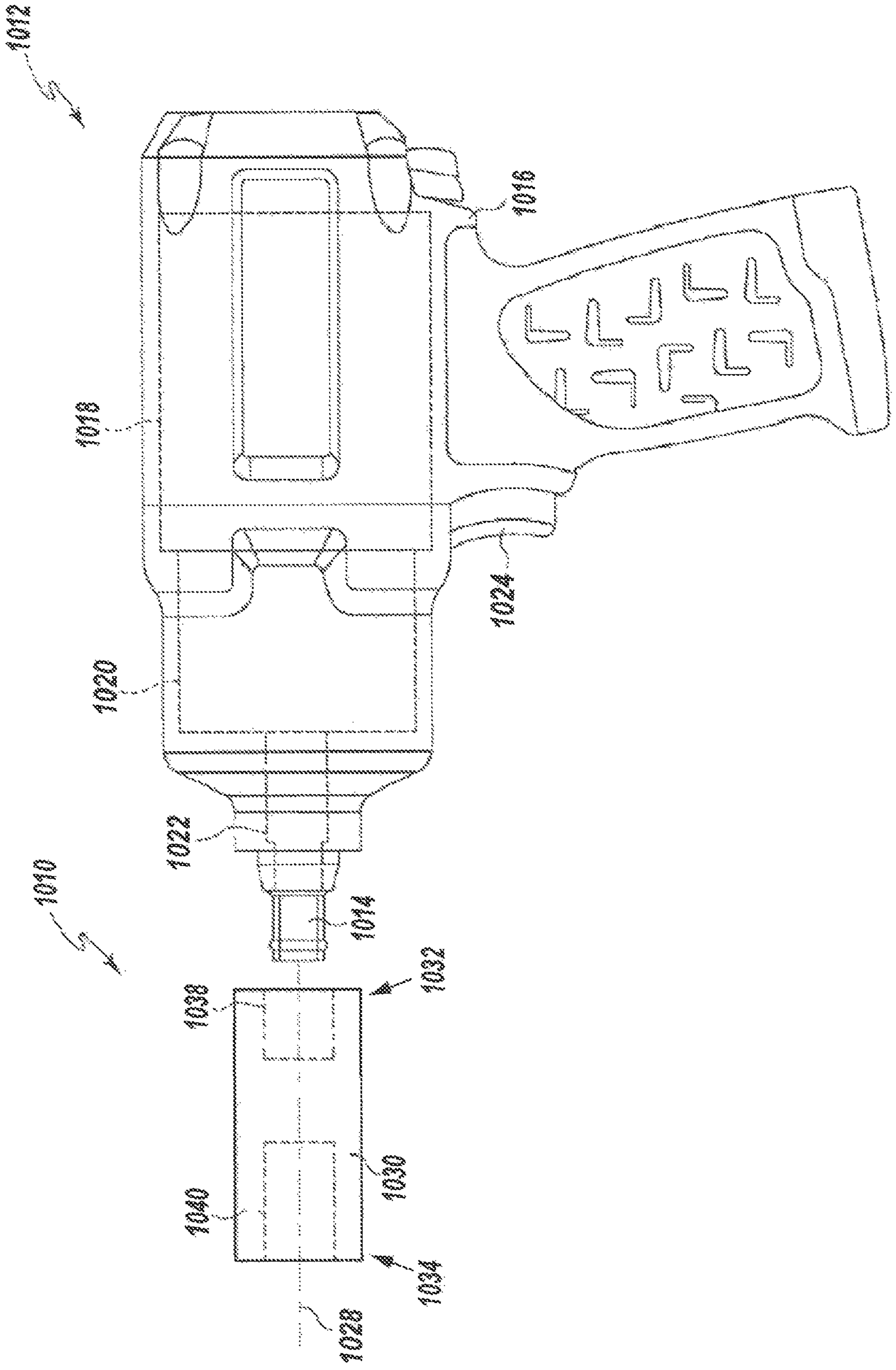
FIG. 1 (Prior Art)
FIG. 1 is a side view of one embodiment of a common impact wrench and standard socket.

Referring now specifically to the drawings, an example of a prior art impact wrench and a common a socket, is illustrated and shown generally in FIG. 1. The socket 1010 may be attached to and driven by an impact tool that is a source of high torque, such as an impact wrench 1012. The impact wrench 1012 ordinarily includes an output shaft or anvil 1022 having a socket engagement portion 1014 sized for coupling to the socket 1010. The socket 1010 is intended to be selectively secured to and removably coupled to the impact wrench 1012.

A common socket 1010 ordinarily has a longitudinal axis 1028 that defines the rotational axis of the socket 1010 when it is secured to the socket engagement portion 1014 of the anvil 1022 of the impact wrench 1012. The socket 1010 also includes a body 1030 that extends along the axis 1028 from a first longitudinal end 1032 to an opposite second longitudinal end 1034. An input recess 1038, which is sized to receive and mate with the socket engagement portion 1014 of the anvil 1022 of the impact wrench 1012, is defined at the first longitudinal end 1032 of the socket body 1030. Typically, the recess 1038 is square-shaped to match the standard square-shaped cross-section (see FIG. 2) of the socket engagement portion 1014 of the output shaft or anvil of impact wrench 1012. It should be appreciated that the square-shaped socket engagement portion 1014 of a common anvil 1022 may have other features, such as, for example, rounded or chamfered edges, or retention features, such as spring loaded balls, O-rings, or other features. In such embodiments, the recess 1038 may be shaped to match the configuration of the socket engagement portion 1014 of the output shaft or anvil 1022 of the impact wrench 1012.

The socket 1010 normally includes an output recess 1040 that is defined at the opposite second longitudinal end 1034 of the body 1030. The output recess 1040 is sized to receive a head of a fastener. Typically, the recess 1040 is hexagonal (see FIGS. 3 and 6) to match a common hexagonal-shaped mating portion of a fastener 1. The fastener 1 may be a nut, screw, bolt, lug nut, etc. It should be appreciated that in other embodiments the output recess 1040 may be configured to receive fasteners having other types of heads, such as, for example, square, octagonal, Phillips, flat, star-shaped or Torx compliant, and so forth. As is well known within the art, at least a portion of the fastener 1 (e.g. a hex-nut, the head of a bolt and the body of a screw) has a polygonal-shape that corresponds with the polygonal-shaped output recess 1040. During use, the polygonal-shaped portion of the fastener 1 is inserted into the polygonal-shaped output recess 1040 for operation and is selectively secured to one another, often by friction fit. The socket 1010 is typically made of a durable hard material, such as steel.

Figure 2:
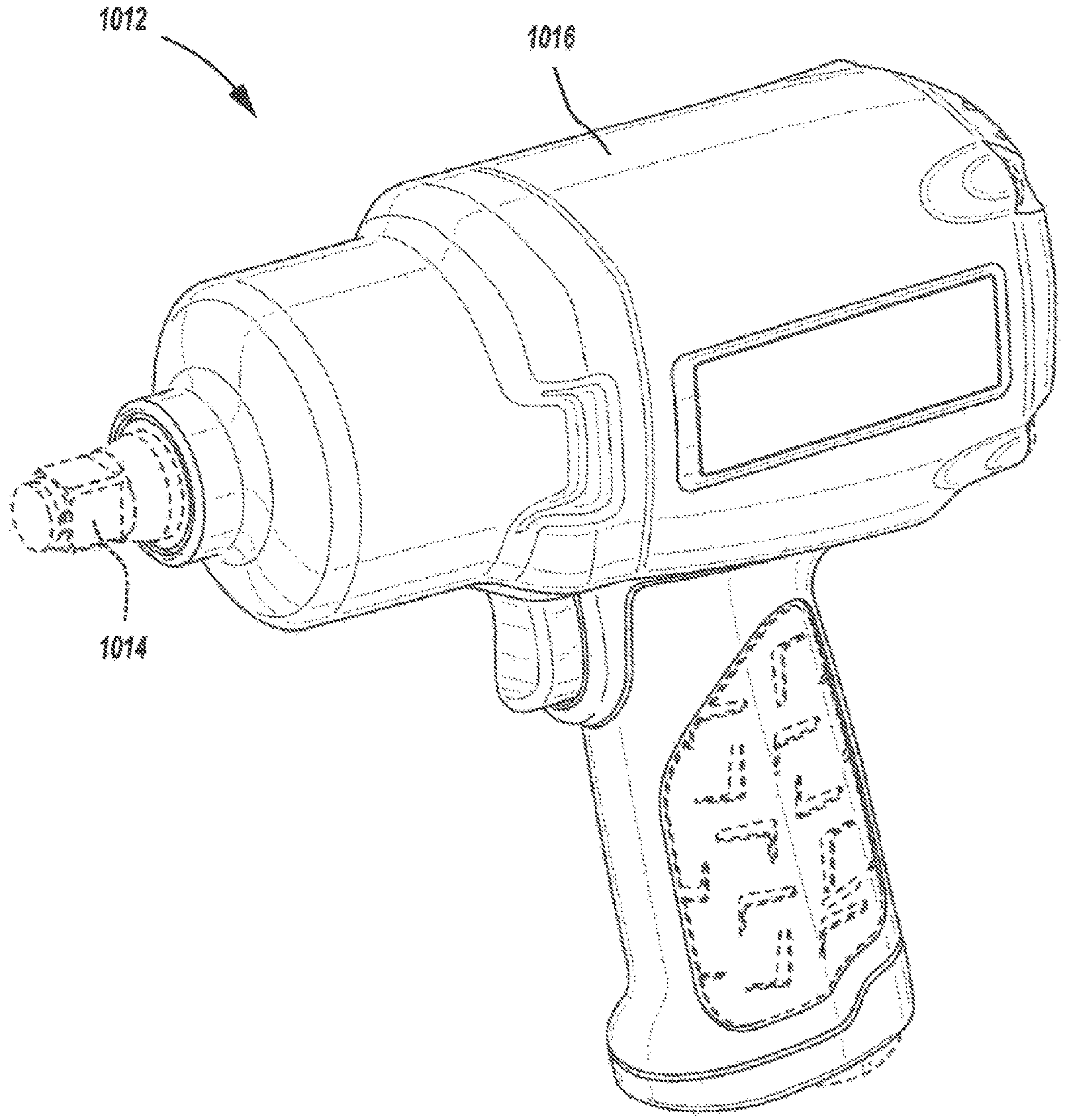
FIG. 2 (Prior Art)
FIG. 2 is a perspective view of the common impact wrench of FIG. 1.
Figure 3:
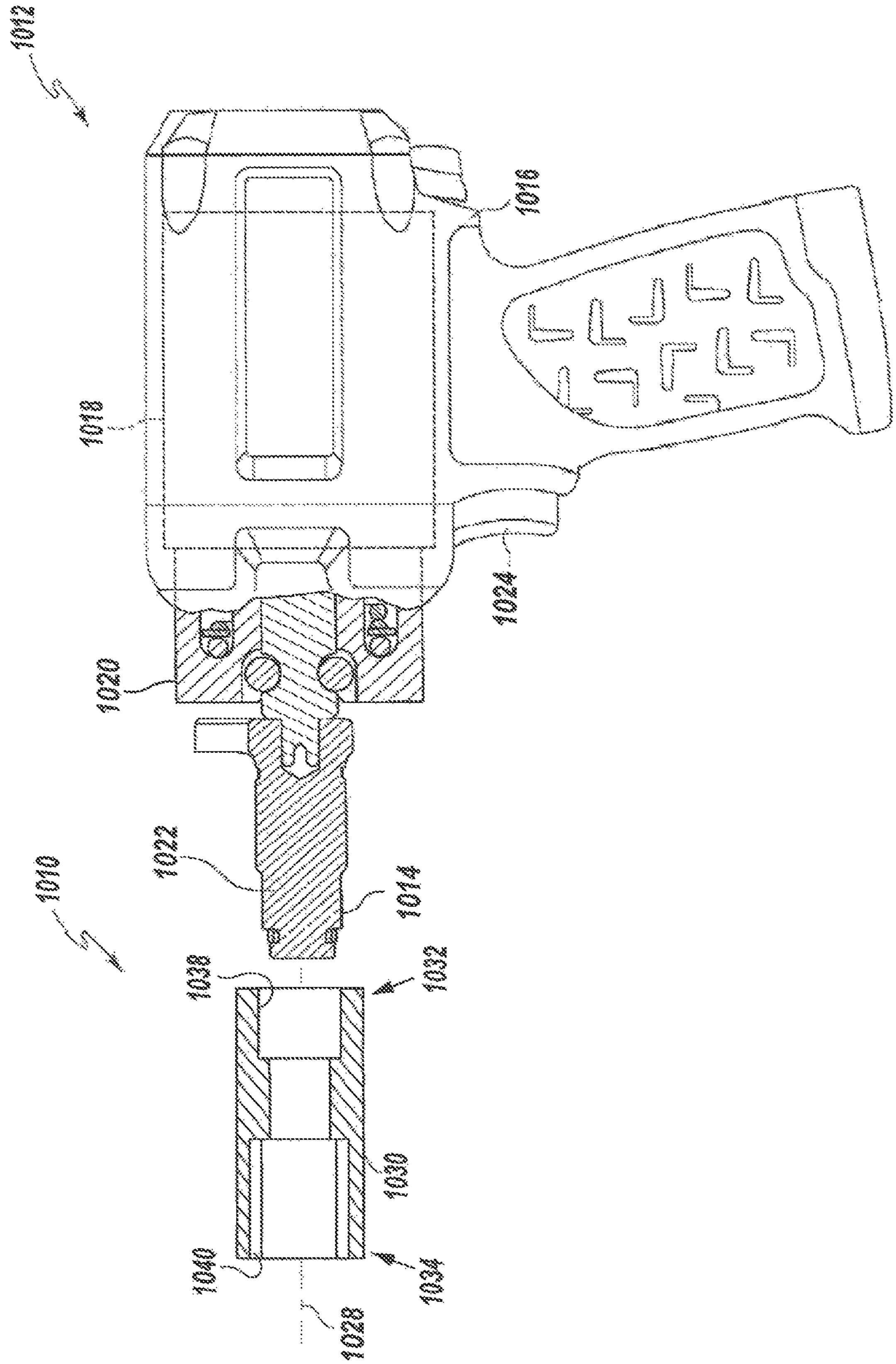
FIG. 3 (Prior Art)
FIG. 3 is a partial cut-away view of the common impact wrench and standard socket of FIGS. 1 and 2.

As is well known by one of ordinary skill in the art, a typical impact wrench 1012 is designed to receive a standard socket 1010 and designed to deliver high torque output with the exertion of a minimal amount of force by the user. As shown in FIGS. 1-3, a common impact wrench 1012 normally includes a housing 1016 that encases a motor 1018. The motor 1018 is often configured to be driven by a source of compressed air (not shown), but other sources of power may be used. Those sources may include electricity, hydraulics, etc. In operation, the motor 1018 accelerates a mass such as, for example, a hammer 1020 that is configured to spin and generated rotating inertia storing energy. This rotating inertia spends a period of time accelerating freely until periodically a clutch of substantial material suddenly interrupts and kinetically locks the rotating mass to the bolt or nut through the anvil 1022 and a socket 1010 connected in series with the anvil 1022. The high torque output is, therefore, accomplished by storing kinetic energy in a rotating mass, such as a hammer 1020, and then delivering the energy to a fastener engaged with a socket 101, which is in turn engaged with an output shaft or anvil 1022 of the impact wrench 1012. The hammer 1020 is configured to suddenly strike, contact, or otherwise engage the output shaft or anvil 1022. The sudden engagement of the hammer 1020 with the anvil 1022 creates a high-torque impact. In the illustrative embodiment, the hammer 1020 is configured to slide within the housing 1016 toward the anvil 1022 when rotated. A spring (not shown) or other biasing element may bias the hammer 1020 out of engagement with the anvil 1022. Once the hammer 1020 impacts the anvil 1022, the hammer 1020 of the impact wrench 1012 is designed to freely spin again. As shown in FIGS. 1-3, the impact wrench 1012 also includes a trigger 1024 that is moveably coupled relative to the housing 1016. In use, compressed air, electric power, or hydraulic fluid, etc. is delivered to the impact wrench 1012 when the trigger 1024 is depressed.

Figure 4B:
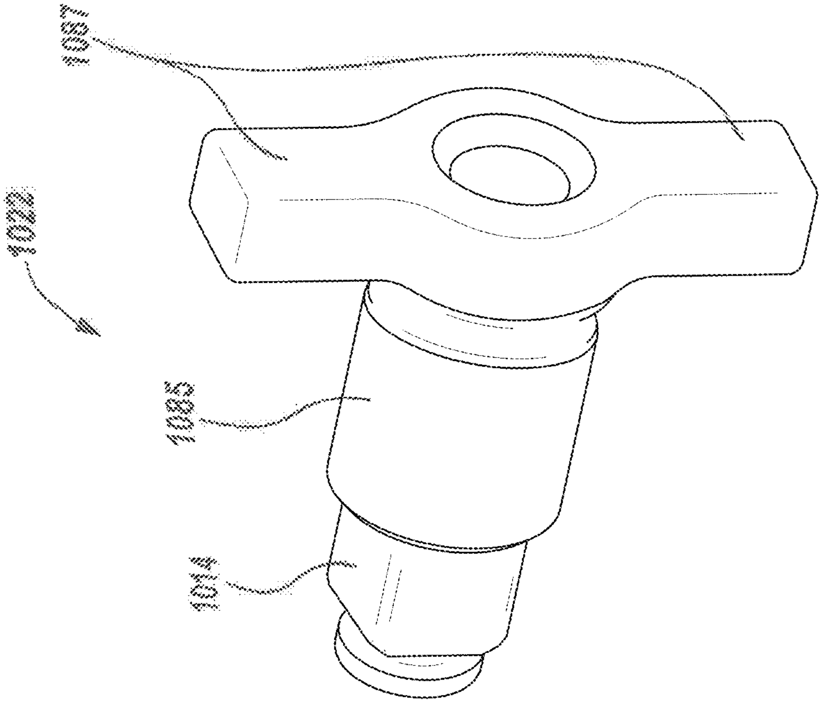
FIG. 4B (Prior Art)
FIG. 4B is a rear perspective view of an embodiment of the standard ball and cam anvil mechanism of FIG. 4A.
Figure 4A:
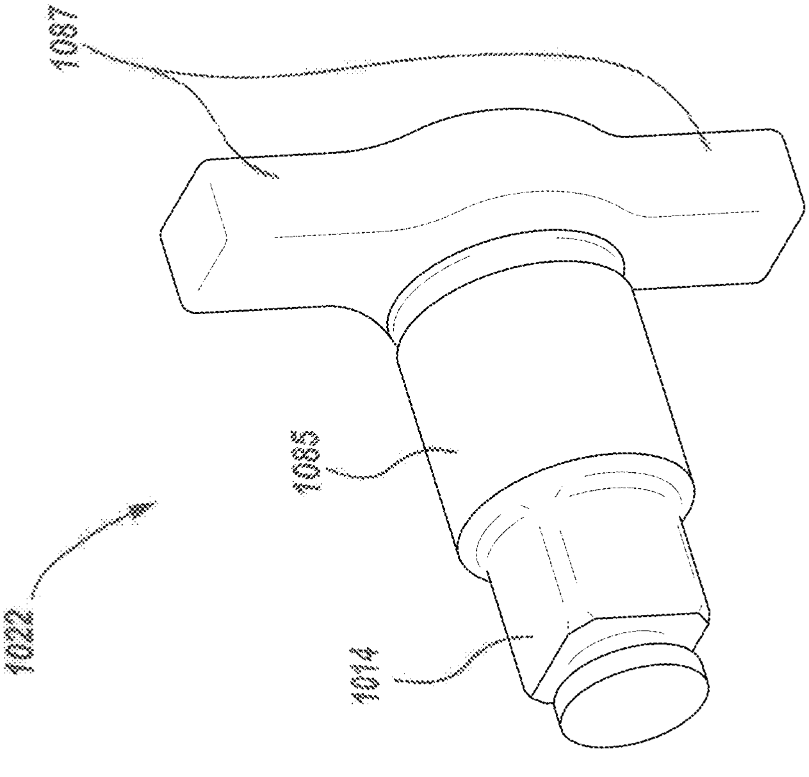
FIG. 4A (Prior Art)
FIG. 4A is a front perspective view of an embodiment of a standard ball and cam anvil mechanism that is often used with a common impact wrench and a standard socket.
Figure 5:
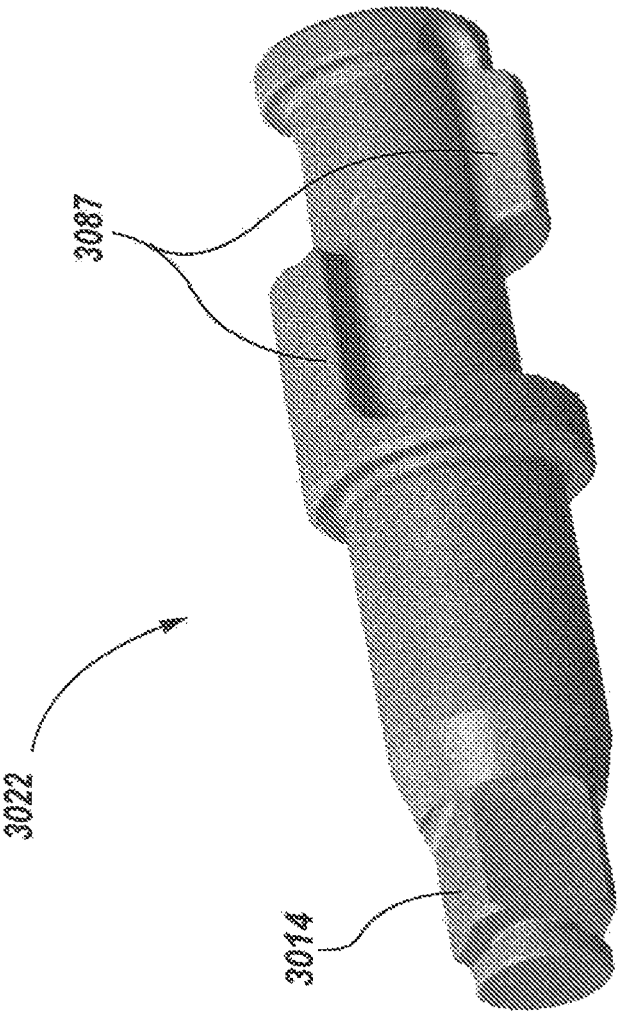
FIG. 5 (Prior Art)
FIG. 5 is a front perspective view of an embodiment of a standard swinging weight or Maurer mechanism that is often used with a common impact wrench and a standard socket.

Those of ordinary skill in the art appreciate that there are many known hammer 1020 designs, and also recognize that is important that the hammer 1020 is configured to spin relatively freely, impact the anvil 1022, and then spin relatively freely again after impact. In some common impact wrench 1012 designs, the hammer 1020 drives the anvil 1022 once per revolution. However, there are other impact wrench 1012 designs where the hammer 1020 drives the anvil 1022 twice per revolution. The partial cut-away view of the impact wrench 1012 depicted in FIG. 3 reveals a standard ball and cam mechanism hammer and anvil design. FIGS. 4A and 4B respectively depict front and rear perspective views of a standard ball and cam anvil 1022. An embodiment of the common square socket mating engagement portion 1014 is prominently shown in FIG. 4A, while both FIG. 4A and FIG. 4B show how the anvil jaws 1087 extend radially from a central axis of the anvil 1022. The portion of the anvil 1022 that extends between the jaws 1087 and the square-shaped socket engagement portion 1014 functions as a bearing journal and helps align and support the anvil 1022 during use. A ball and cam anvil 1022 is often utilized in an impact wrench powered by an electric motor, Another common anvil embodiment is shown in FIG. 5, which depicts a standard swinging weight or Maurer mechanism anvil 3022. This common type of anvil 3022 includes the typical square-shaped socket engagement portion 3014. Near the other end of the anvil 3022 are jaws 3087 that are relatively small in diameter, as compared to the common ball and camp anvil 1022 of FIGS. 1-4B. A common Maurer mechanism anvil 3022 is typically utilized in conjunction with a pneumatically-powered impact wrench. In addition, a Maurer mechanism like anvil 3022 may permit operation with a double hammer design.

The output torque of an impact wrench, such as impact wrench 1012, can be difficult to measure, since the impact by the hammer 1020 on the anvil 1022 is a short impact force. In other words, the impact wrench 1012 delivers a fixed amount of energy with each impact by the hammer 1020, rather than a fixed torque. Therefore, the actual output torque of the impact wrench 1012 changes depending upon the operation. An anvil, such as anvil 1022 or 3022 is designed to be selectively secured to a socket, such as socket 1010. This engagement or connection of the anvil, such as anvil 1022, 3022, to the socket, such as socket 1010, results in a spring effect when in operation. This spring effect stores energy and releases energy. Additionally, there is a spring effect between the socket 1010 and the fastener 1 to which it is engaged. Again, this spring effect stores energy and releases energy.

Figure 6:
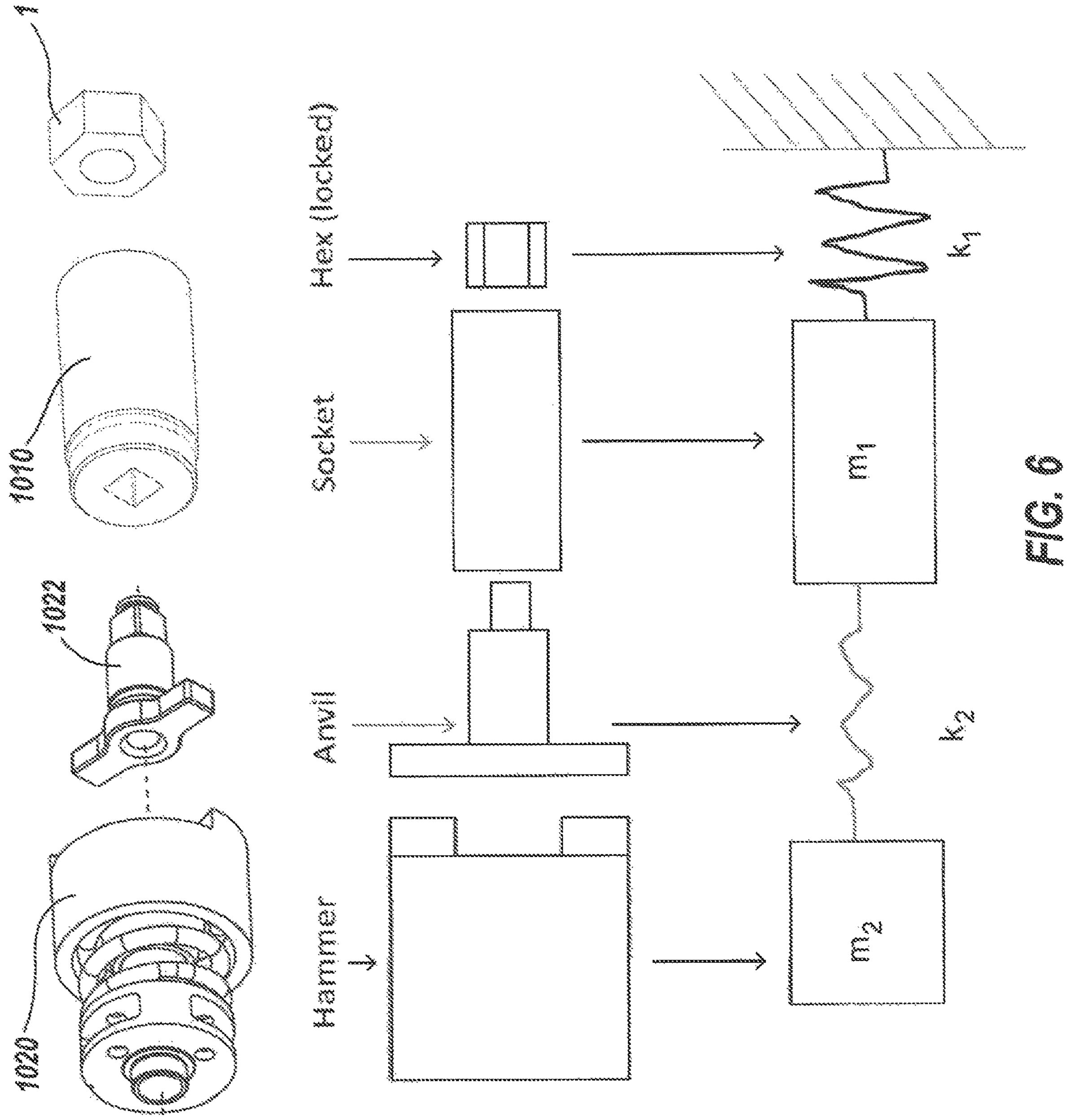
FIG. 6 is an exploded perspective view of a drive system of a common impact wrench having a common ball and cam mechanism, wherein the drive components are correlated with and respectively equated into a corresponding double oscillator model.
Figure 7:
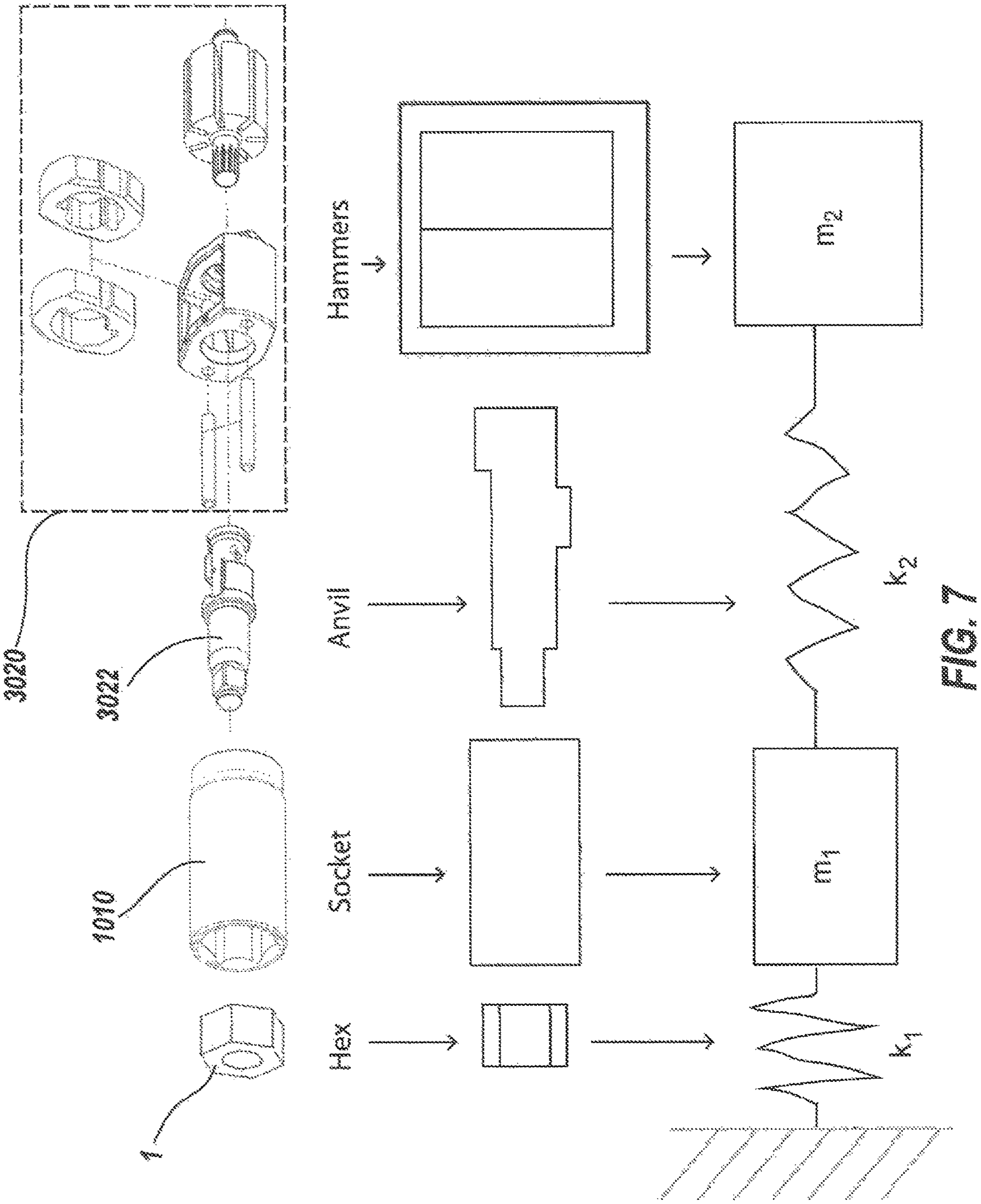
FIG. 7 is an exploded perspective view of a drive system of a common impact wrench having a standard swinging weight or Maurer mechanism, wherein the drive components are correlated with and respectively equated into a corresponding double oscillator model.
Figure 8:
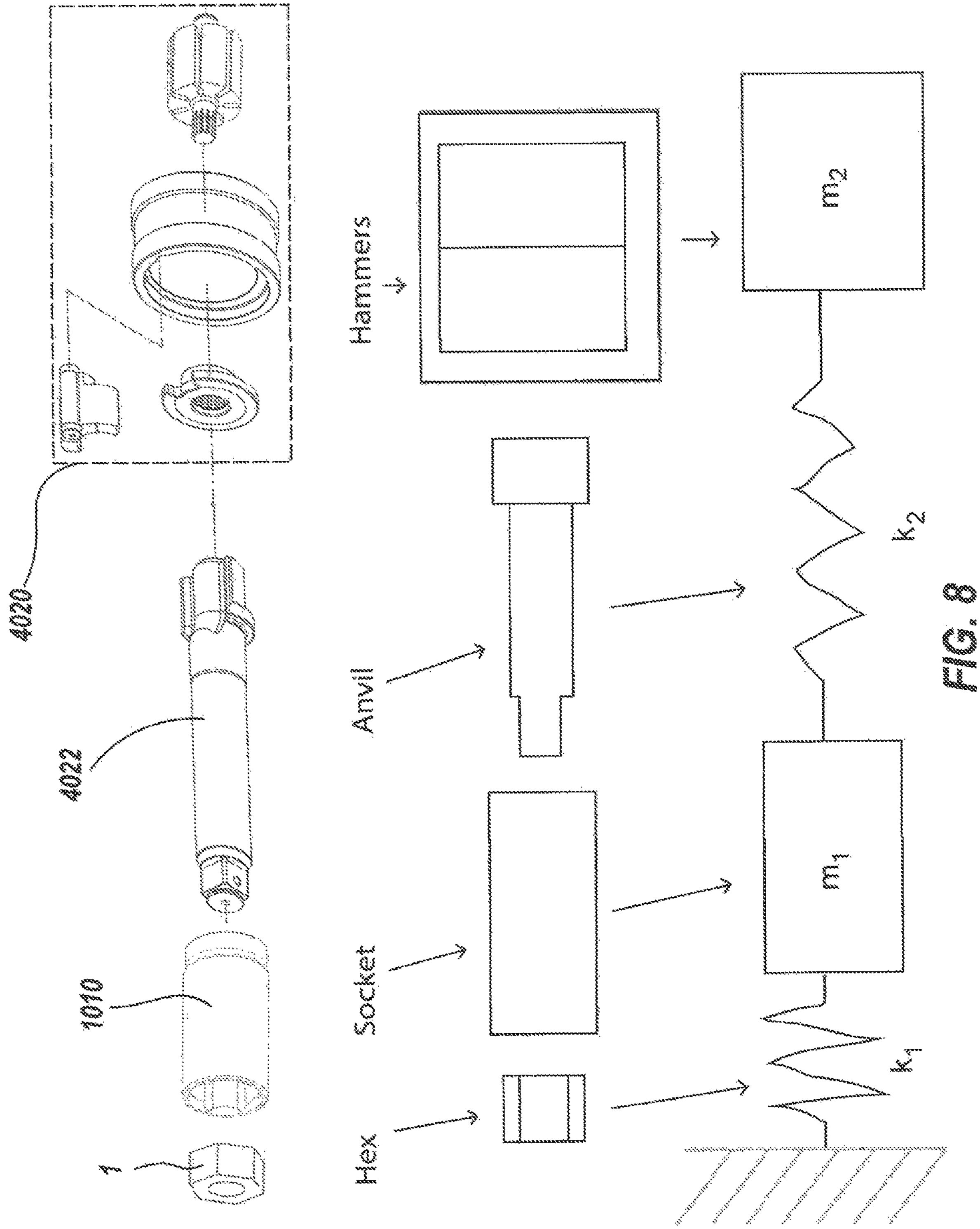
FIG. 8 is an exploded perspective view of a drive system of a common impact wrench having a standard rocking dog mechanism, wherein the drive components are correlated with and respectively equated into a corresponding double oscillator model.

It may be beneficial to model the spring effects associated with tightening fasteners using an impact wrench. As is known to one of ordinary skill in the art, the combination of two masses ($m_1$ and $m_2$) and two springs ($k_1$ and $k_2$) is often referred to as a double oscillator mechanical system. In this system, the springs ($k_1$ and $k_2$) are designed to store and transmit potential energy. The masses ($m_1$ and $m_2$) are used to store and transmit kinetic energy. The drive system or drive components and mechanisms of common impact wrenches can typically be broken down into common fundamental elements. Ordinarily, the drive system is composed of a motor, a hammer, an anvil, a socket, and a joint (or fastener component that is to be driven). The motor can be directly or indirectly coupled to a hammer. The hammer often engages an anvil having mating jaws spaced apart from the center of rotation. The anvil is coupled to a socket with a mating geometric shape, usually a square, and the socket is usually coupled to the nut of the joint with mating hex geometry. As depicted in FIGS. 6-9, three common impact wrench drive mechanisms are shown in exploded perspective view with drive components respectively modelled. For example, FIG. 6 depicts an exploded perspective view of a drive system of an impact wrench having a common ball and cam mechanism, with components similar to those depicted in FIGS. 1-4B, wherein the drive components are correlated with and equated into a double oscillator model. As modelled, the joint or hex fastener 1 is equated with a first spring $k_1$. The standard socket 1010 is equated with a first inertial mass $m_1$. The common ball and cam anvil 1022 is equated with a second spring $k_2$, and the associated ball and cam hammer 1020 is equated with a second inertial mass $m_2$. The arrows in FIGS. 6-8 are provided for purposes of clarity, primarily to show how each respective mechanical component has a corollary model component.

A common impact wrench drive system employing a standard swinging weight or Maurer mechanism is particularly depicted and modelled in FIG. 7. The socket 1010 and hex fastener 1 may be configured the same as or similar to those depicted in FIG. 6, but the swinging weight Maurer mechanism differs, inter alia, from the standard ball and cam mechanism, in that it employs a dual hammer component 3020 and a generally cylindrical anvil 3022 having jaw features correspondingly configured to engage the dual hammers 3020. The dashed-line box is provided for purposes of clarity, to surround and, thereby, designate the component features of the hammer 3020. Another well-known impact wrench drive system employing a standard rocking dog mechanism is particularly depicted in FIG. 8. Again, the socket 1010 and hex fastener 1 may be configured the same as or similar to those depicted in FIGS. 6 and 7. In a similar manner, a dashed line is provided to delineate the components of the rocking dog hammer 4020. The anvil 4022 is also generally cylindrical with jaw features configured to engage the rocking dog hammer 4020. The socket mating end of the anvil 4022 is a standard square shape, and, in a similar manner, the socket mating ends of the anvils 1022 and 3022 depicted respectfully in FIGS. 6 and 7 are also provided with a standard square shape.

For purposes of modelling, the common square drive anvil inertia is extremely low relative to the other components and is treated purely as a torsional spring. The compliance of the drive connection between the socket and the anvil is lumped into the total stiffness of the rest of the anvil and, for purposes of further modelling, will be assumed to be included in the term "anvil stiffness" and will be discussed later. The socket, such as socket 1010 is of relatively high stiffness but relatively large in inertia and is therefore treated as a pure inertia. For the sake of mathematical modeling the joint (or hex fastener 1) is assumed to be in the "locked" condition, i.e. unable to be moved further, allowing the hex interface to be modeled as a very stiff spring. It is the point at which the tool cannot move the hex any further that will characterize the "power" of the system. This is true in practice as well. A weak tool normally reaches a locked hex in a relatively short angle and the installed torque is low, whereas a strong tool normally reaches locked hex in a larger angle and achieves a higher installed torque on the same bolt.

The double oscillator system can be tuned to efficiently and effectively transfer energy from the impact device or hammer (modelled as $m_2$) through the anvil-socket connection (modelled as $k_2$), the socket (modelled as $m_1$) and socket-fastener connection (modelled as $k_1$) and into the joint fastener 1. Proper tuning can help ensure most of the energy delivered by the impact wrench hammer $m_2$ is transferred through the anvil-socket connection spring $k_2$ and into the socket $m_1$. During use, the rate of deceleration of the inertial mass of the socket $m_1$ is very high since spring $k_1$ is stiff. Since deceleration is high the torque exerted on the fastener is high.

Figure 9:
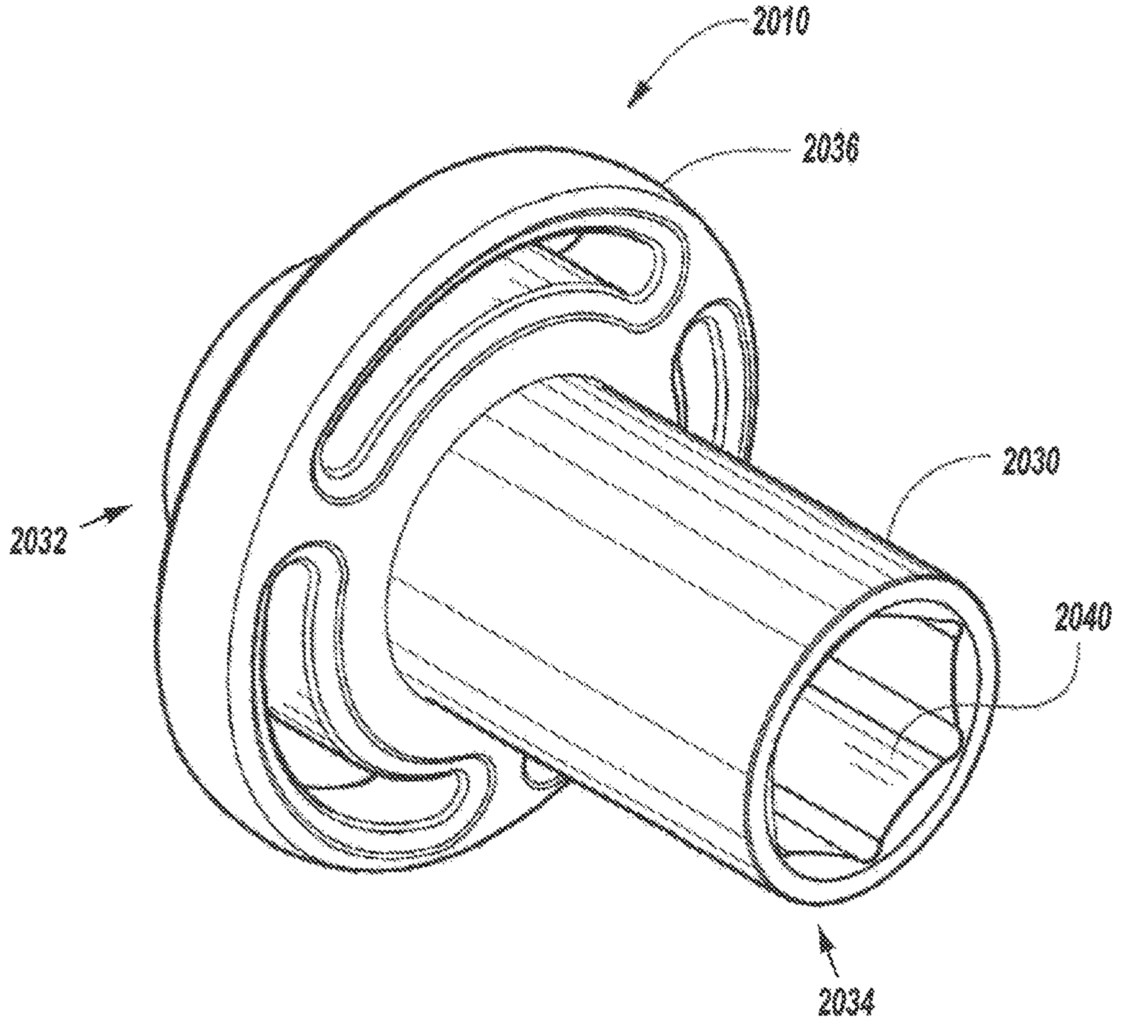
FIG. 9 is a front perspective view of an embodiment of a tuned power socket
Figure 10:
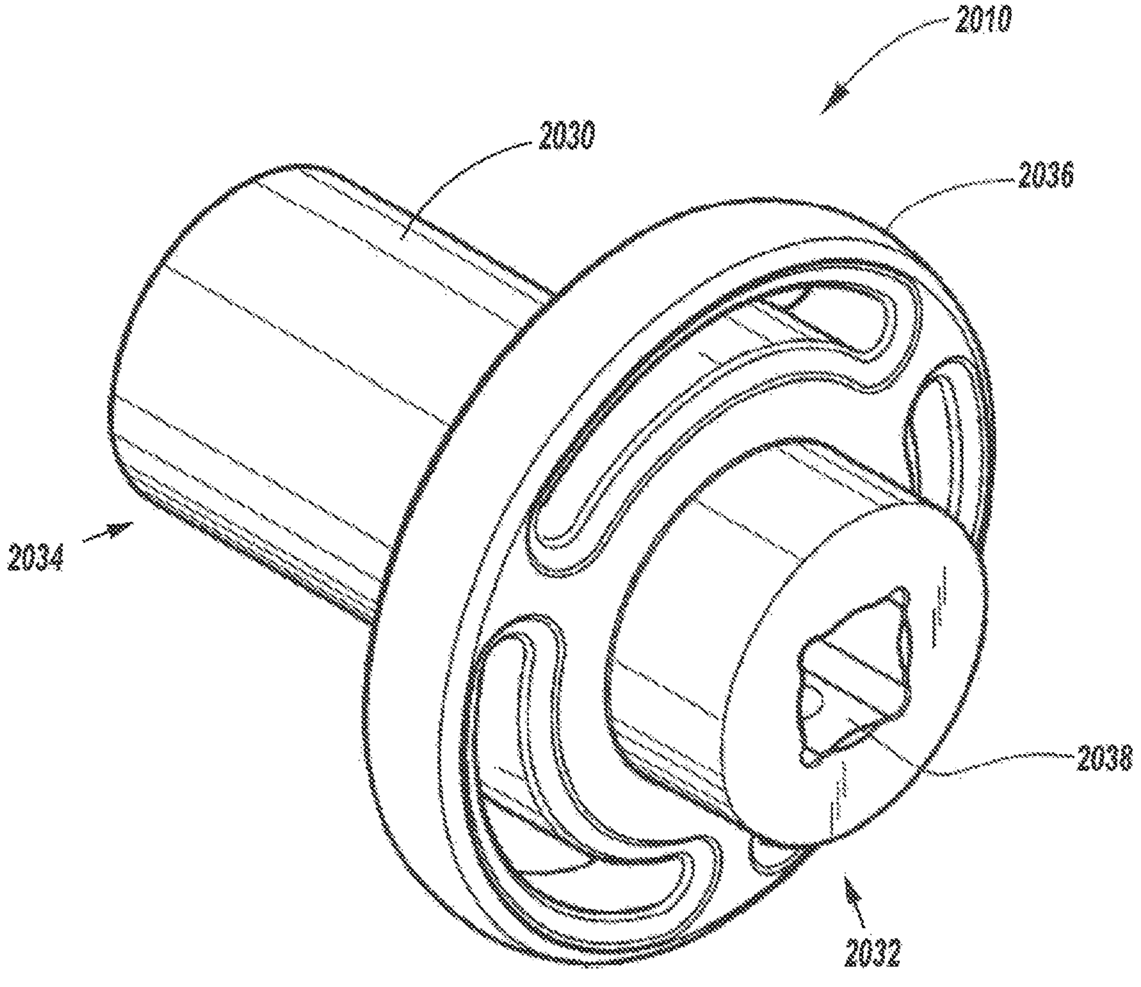
FIG. 10 is a rear perspective view of the embodiment of the tuned power socket of FIG. 9.
Figure 11:
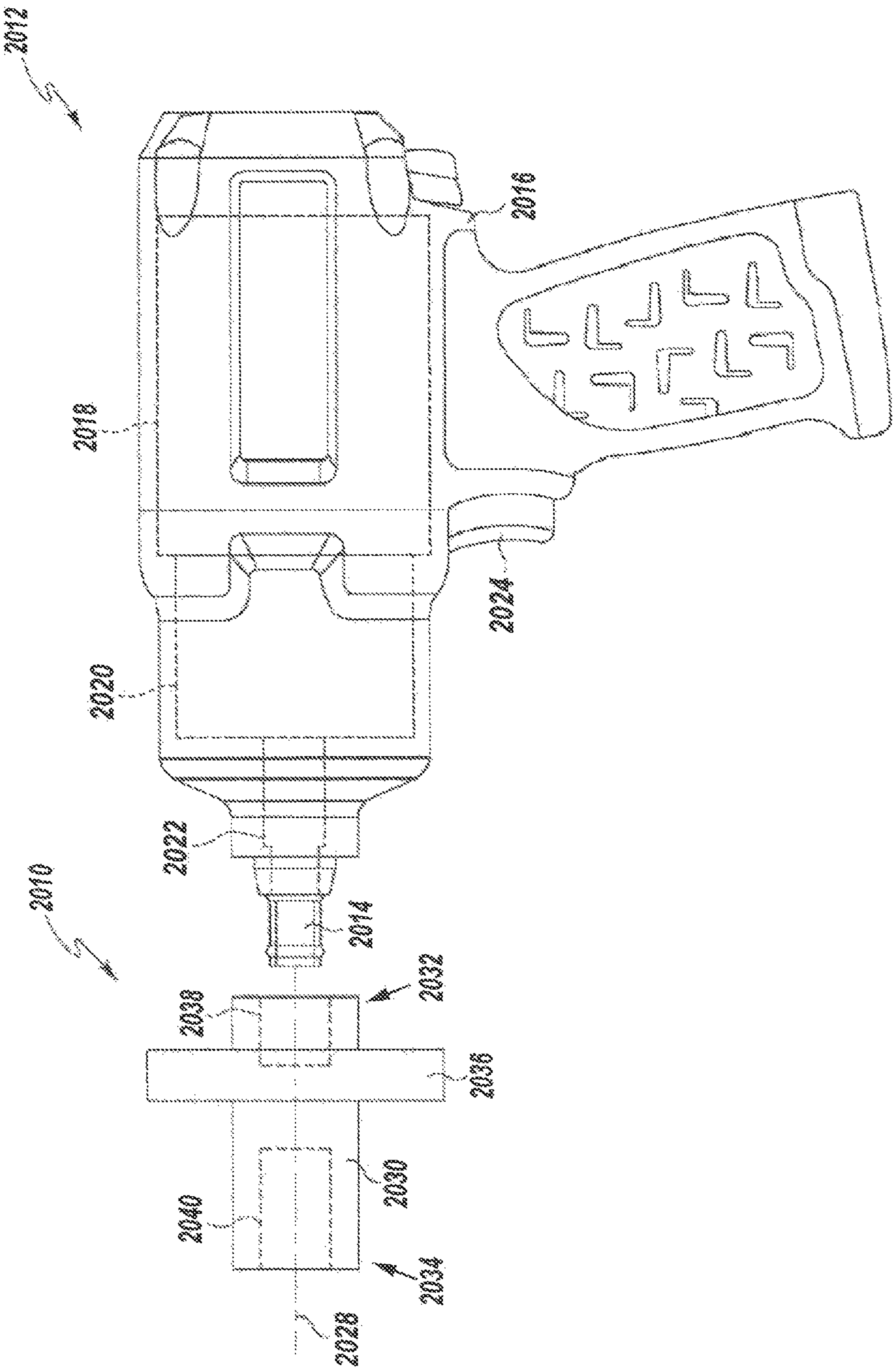
FIG. 11 is a side view of one embodiment of a common impact wrench and tuned power socket.
Figure 12:
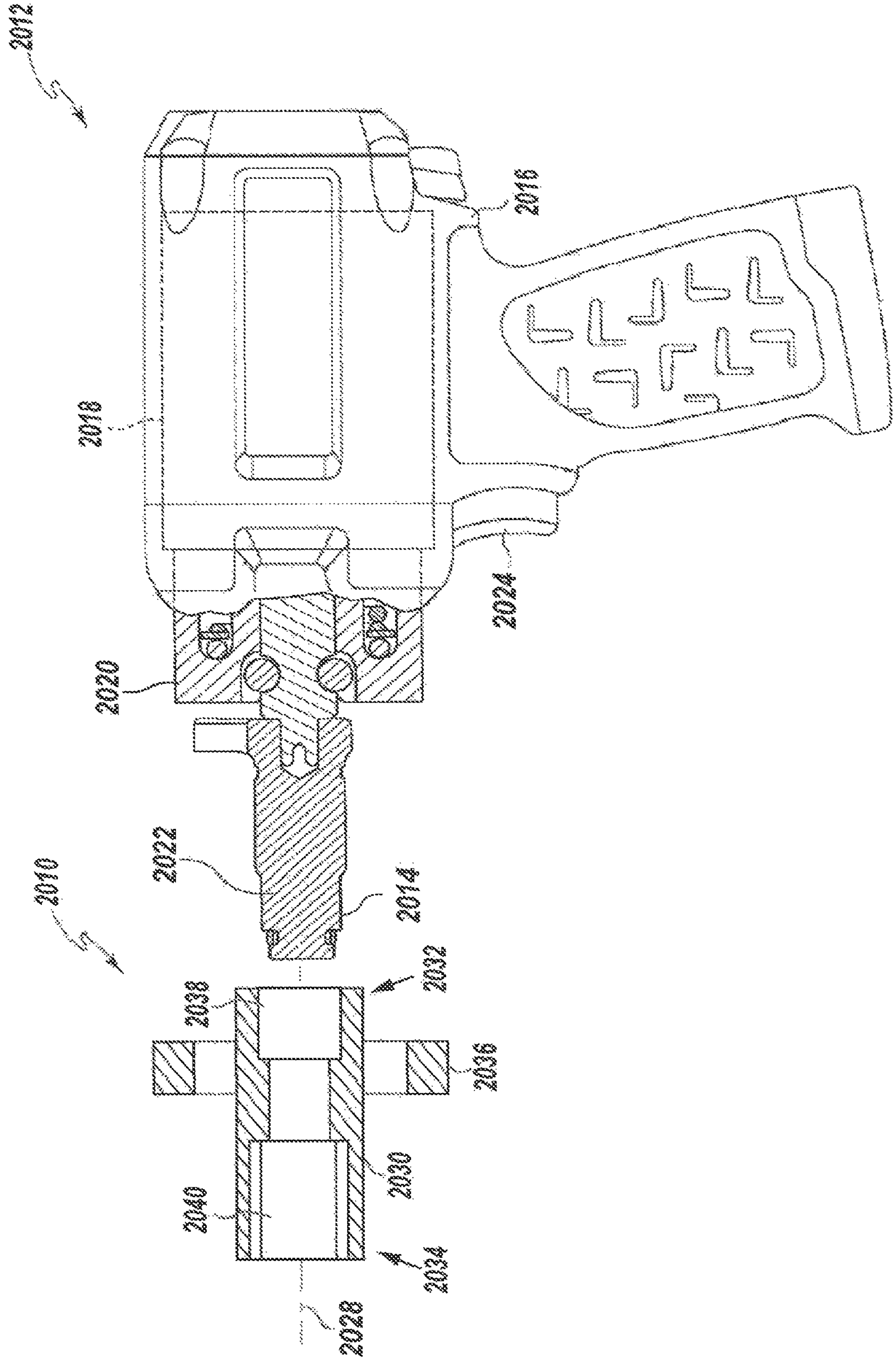
FIG. 12 is a partial cut-away view of the common impact wrench and tuned power socket of FIG. 11.

One way to tune the drive components of an impact wrench is to increase the inertial mass of the socket; to create a power socket. This can be done, inter alia, by providing the socket with an inertial feature, such as for example an annular ring located a radial distance away from the central axis of the socket. As depicted in FIGS. 9 and 10, the annular ring may act as an inertial member 2036 increasing the inertial mass of socket 2010. The purpose of the inertia member 2036 is to increase the overall performance of an impact wrench, by increasing the net effect of the rotary hammer inside the impact wrench, such as rotary hammer 2020 of impact wrench 2012 depicted in FIGS. 11 and 12. The impact wrench 2012 may be similar to an impact wrench 1012, and may include similar component elements, such as a housing 2016, a motor 2018, a trigger 2024, and an anvil 2022 having a standard square-shaped socket engagement portion 2014. The socket 2010 may include a square shaped input recess 2038, which is sized to receive and mate with the standard square-shaped socket engagement portion 2014 of the anvil 2022 of the impact wrench 2012. As depicted, the drive mechanism is a common ball and cam mechanism, but any drive mechanism having a square-shaped socket engagement component may be operable with and tunable for improved performance through use of a power inertia socket, such as socket 2010. The socket 2010 may also include an output recess 2040 that is sized to receive a head (typically a hex head) of a fastener 1. The performance is increased as a result of the inertia member 2036 functioning as a type of stationary flywheel on the socket 2010. Stationary flywheel means the flywheel is stationary relative to the socket 2010, but moves relative to the anvil 2022 and the fastener 1. By acting as a stationary flywheel, the inertia member 2036 increases the amount of torque applied to the fastener 1 for loosening or tightening the fastener.

Figure 13:
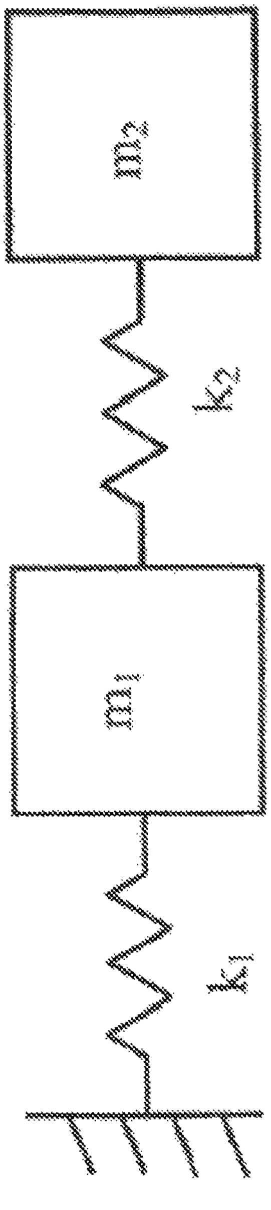
FIG. 13 is a block diagram modelling fastening operation of a common impact wrench and a tuned power socket having an inertia member that adds a substantial mass a large distance from the axis of rotation of the socket.

In reference to the disclosed tuned power socket embodiments, as illustrated in FIG. 13, the inertia member 2036 adds a substantial mass a large distance from the axis of rotation 2028 of the socket 2010. It should be noted that FIG. 13 is shown and modelled in a linear mode, but the impact wrench and socket is a rotary system. Nevertheless, the socket 2036 having inertia member 2036 is represented by $m_1$. The socket having inertial member $m_1$ is operationally situated between spring effects $k_1$ and $k_2$; in other words, the socket connects with both the fastener 1 (modelled as spring effect k1) and the anvil (modelled as spring effect $k_2$). Hence, the spring rate of the common square-shaped anvil and socket connection is represented by $k_2$ and the spring rate of the socket and fastener connection is represented by while the fastener itself is represented by ground. The mass moment of inertia of the impact wrench is designated $m_2$ and represents the mass moment of inertia of the rotary hammer inside the impact wrench. With respect to the tuned power socket 2010, the spring rate of $k_1$ is three times that of $k_1$ and $k_2$ combined, causing very high torques to be transmitted from the socket 2010 having an inertia member (modelled as $m_1$) to the fastener.

When impact wrench drive system tuning is focused primarily on the socket, the tuning process operates under the notion that there is an optimal socket inertia for a given combination of mechanism inertia and joint and anvil stiffness. As such, the elements of the double oscillator system are predetermined. The rotary hammer inside the impact wrench $m_2$ and springs $k_1$ and $k_2$ are assumed to have defined values. For tuning the system with the focus primarily on the socket, the only value which needs to be determined is the inertia member $m_1$ 2036 of the socket 2010, in order to achieve socket-optimized inertia. A common impact wrench, depending upon the drive size (i.e. ½", ¾", 1"), has a different optimal inertia for each drive size. The spring rate $k_2$ and the rotary hammer interia m; inside the impact wrench are substantially the same for all competitive tools of similar drive size incorporating common drive mechanisms, such as, for example, those impact wrench drive systems depicted and modelled in FIGS. 6-8. However, while a tuned power socket significantly increases impact wrench drive system performance, the non-tuned components, such as the hammer, the anvil, and the socket still may dynamically harbor unused energy, thereby preventing full power transfer from the impact wrench to the fastener joint being worked upon. The tuning of the impact wrench drive system is not fully realized or optimized.

To fully, and even optimally, tune an impact wrench drive system, focus may also be placed on the anvil and socket combination, two important components of an impact wrench drive system, and tuning methodology may consider optimizing the characteristics of each of the impact wrench drive system components that function together, to not only to have a stronger interconnection between the parts but to also perform at a higher level without introducing additional power input. Such optimal impact wrench tuning methodology introduces the concept of dynamic manipulation of both the socket inertia and the anvil-socket stiffness, in order to minimize the socket inertia for maximum output, thereby minimizing total tool weight and size. Dynamic impact wrench tuning, therefore, contemplates the ratio of the inertia of the combined socket and anvil components, as well as the inertia of the impacting mechanism, and considers how drive system performance has a specific relationship with the ratio of the anvil/socket combination stiffness and hex stiffness to achieve maximum output at the minimum total weight. The theory behind tuning the power socket, and in particular the methodology associated with determining the optimal component inertia of the socket still applies. The difference is the introduction of an additional independent variable.

When dynamically tuning impact wrench drive components, focus may be placed on the behavior of the various drive system elements, when in contact as a result of the collision of the hammer with the anvil from the moment of first contact until the moment the energy has reached and transferred to the bolt hex. At the beginning of this energy transfer period the hammer inertia has some initial velocity which represents all the kinetic energy that any particular impact can possibly have. When initial contact between the anvil and hammer jaws occurs, there is ordinarily a measurable amount of rotational clearance between the engaged components that must be consumed before any energy can transfer. There may be rotational play between anvil and socket, particularly if that connection is facilitated by the common square-shaped geometry. There is also rotational play between the internal hex of the socket and the external hex of the nut. Depending on how one chooses to consider the rotational clearance typically existent between impact wrench drive system components, there are two primary tuning models that may be implemented to fully, and even optimally, tune the impact wrench drive system. The optimal cases for each of the tuning models serve to provide upper and lower bounds for dynamically tuned impact wrench drive system performance.

Spring-Mass Oscillator Model

For the purposes of this model and related discussion, an assumption is made that rotational play or clearance gaps between impact wrench drive system components has no significant effect on the behavior of the drive system and is assumed to be completely consumed. As the impact wrench drive system components wind up, all of the mechanical elements having varying amounts of inertia and stiffness contribute to a relatively complex oscillatory behavior. Energy is transferred from each spinning inertia to each series spring element, and kinetic energy converts to potential energy and back again in what may seem somewhat chaotic in the span of milliseconds. Tuning methodology focused primarily on modifying a socket to create a tuned power socket has taught us that choosing the inertia of the socket to be substantially higher than that of currently available standard sockets can enhance the transfer and concentration of the energy into the joint without increasing the energy put into the system. Understanding the relationships between these parts and the effects of their inertias and associated stiffness when interacting with each other, and the delivery of energy through the system, is critical to dynamically optimizing the impact wrench system to deliver as much energy to the fastener joint as possible.

The dynamic tuning and optimization process for socket and anvil inertia and stiffness of the various component connections of the impact wrench/fastener joint system begins with a calculation of the system modeled as lumped masses and springs where there is no rotational play or clearance gaps in between the components and the components are connected rigidly when they first come into contact. For the energy transfer time period in question, this assumption is reasonable and helpful to simplify the motion formulas. A typical schematic diagram for modelling a standard air driven impact wrench is shown in the diagrams depicted in FIGS. 6-8. While the anvil configurations, clutch mechanisms and actual equations of motion differ slightly between the various drive mechanisms, the theory and modelling methodology is largely the same.

As discussed previously, a typical square-shaped anvil/socket mating connection has relatively low inertia, and the compliance of the anvil/socket connection is lumped into a total "anvil stiffness." In an ideal case where the designer has complete control over all elements of the system, including the hex, there is a closed form solution to the positions, velocities and accelerations of the spring-mass oscillators shown in FIGS. 6-8. It is as follows, where "x" is the rotational angle, w refers to the angular velocity, f refers to an initial angle and "a" and "C" are constants associated with amplitude. The subscripts 1 and 2 refer to the socket and hammer inertial bodies respectively. Modelling equations may be set forth as follows:

$$x_2 = C_1 a_{21}\sin(\omega_1 t+\phi_1)+C_2 a_{22}\sin(\omega_2 t+\phi_2)$$

$$x_1 = C_1 a_{11}\sin(\omega_1 t+\phi_1)+C_2 a_{12}\sin(\omega_2 t+\phi_2) \quad \text{Equations 1}$$

The initial conditions of the impact wrench drive system are given as:

$x_1=x_2=0$ The arbitrary origins of angular position of the inertias is zero $v_1=0$ The anvil and socket start each impact stationary $v_2$< >0 This is the angular velocity of the hammer after being accelerated by the motor and is treated as a known constant For this set of initial conditions, the constants “a” and “C” are as follows:

$$C_1 = \frac{-a_{12}v_{20}}{(a_{22}a_{11} - a_{12}a_{21})\omega_1} \quad \text{Equation 2}$$

$$C_2 = \frac{-a_{11}v_{20}}{(a_{11}a_{12} - a_{22}a_{11})\omega_2}$$

The phase angles Φ are zero and the a’s describe modal shapes:

$$a_{21} = \frac{k_2 a_{11}}{k_2 - m_2\omega_1^2} \quad \text{Equation 3}$$

$$a_{22} = \frac{k_2 a_{12}}{k_2 - m_2\omega_2^2}$$

The following assignment may be made:

$$a_{11}=a_{12}=1$$

Which, then reduces the “C” and “a” constants to:

$$C_1 = \frac{v_{20}}{(a_{21} - a_{22})\omega_1} \quad \text{Equation 4}$$

$$C_2 = \frac{-v_{20}}{(a_{21} - a_{22})\omega_2}$$

$$a_{21} = \frac{k_2}{k_2 - m_2\omega_1^2} \quad \text{Equation 5}$$

$$a_{22} = \frac{k_2}{k_2 - m_2\omega_2^2}$$

Where the natural frequencies $\omega_1$ and $\omega_2$ are given by:

$$\omega_{1,2}^2 = \frac{1}{2}\left\{\frac{k_1}{m_1} + \frac{k_2}{m_2}\left(1 + \frac{m_2}{m_1}\right) -/+ \sqrt{\left[\frac{k_1}{m_1} + \frac{k_2}{m_2}\left(1 + \frac{m_2}{m_1}\right)\right]^2 - \frac{4k_1k_2}{m_1m_2}}\right\} \quad \text{Equation 6}$$

Equations 1 to 6 describe the motion of the mass under some initial conditions and any set of spring constants and inertias. In the ideal case where the designer has control of all inertias and stiffnesses, the specific values of those quantities can be determined by applying some dynamic energy accounting conditions throughout the impact cycle. Maximum deflection of spring $k_1$, or the peak energy in the hex, would occur when all other components had completely given up their energy at the precise time when $k_1$ reached its peak energy. This means that the hammer and socket have no kinetic energy and hence zero velocity and the anvil, spring $k_2$, has no potential energy and hence, no deflection. Again, this is the ideal case.

To find the optimal torque in spring $k_1$, the following conditions may be applied to Equations 1-6:

At some subsequent time t=A.

$v_{1A}=v_{2A}=0$ When the nut hex ($k_1$) is at its peak torque, the velocity of the hammer and the socket are zero. Otherwise, there would be energy tied up in those components.

$x_{2A}-x_{1A}=0$ The anvil deflection must also be zero, otherwise there will be energy tied up in the anvil that should be in the hex.

$x_{1A}$< >0 The hex “spring” is deflected.

For this set of conditions to be true:

$$m_1 = \frac{3}{4}m_2$$

$$k_1 = \frac{3}{4}k_2$$

The above results describe the optimal inertia and the optimal stiffness of the components that reside between the hammers and the hex under ideal conditions. Hence, when dynamically tuning an impact wrench drive system, in a perfect world, the inertia of the socket/anvil combination must be ¾ of the combined inertia of the hammer components of an impact mechanism at the same time the stiffness of the nut hex must be ¾ of the stiffness of the anvil for maximum output and minimum total weight.

Figure 14:
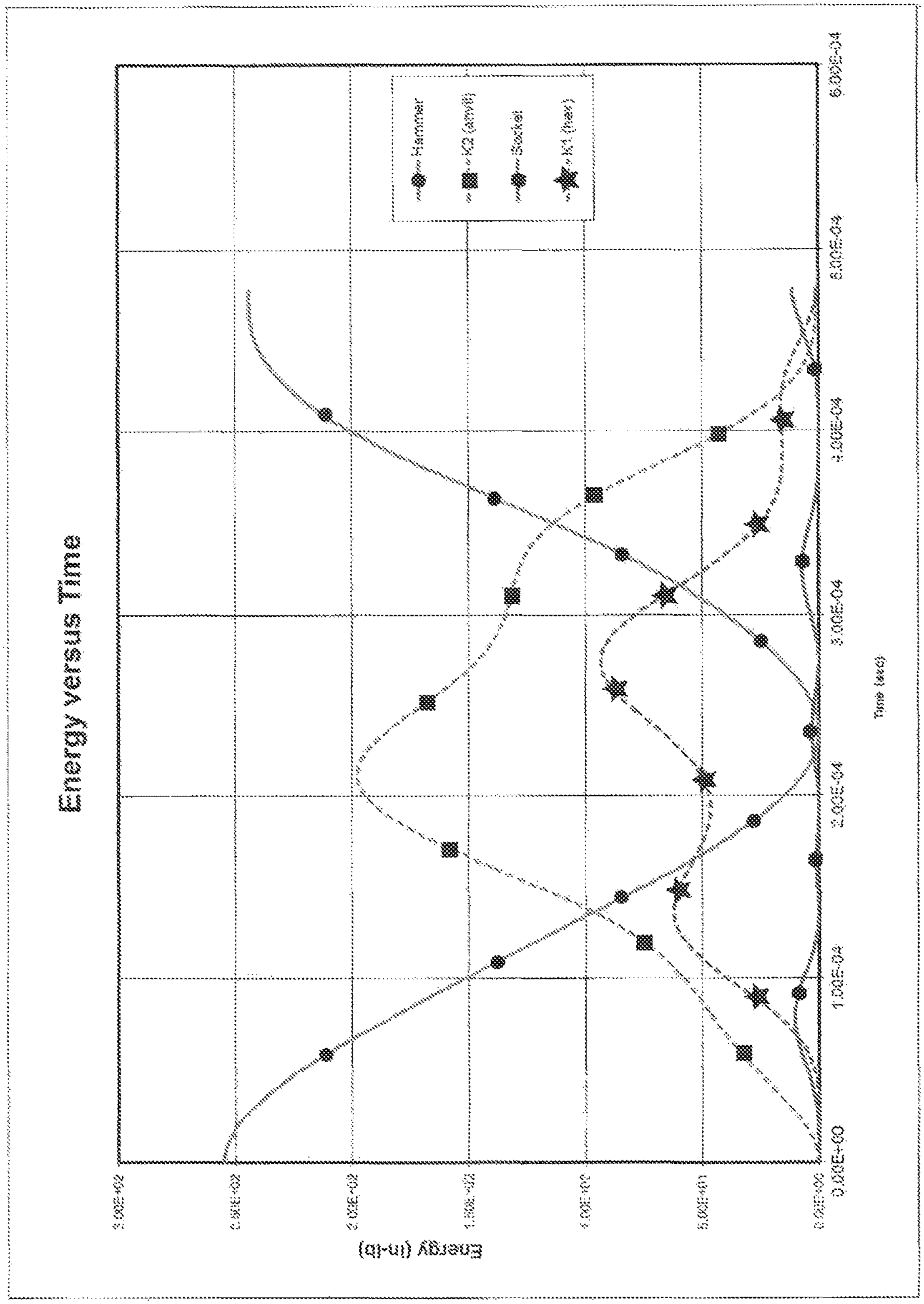
FIG. 14 depicts a plot of energy versus time pertaining to standard non-tuned components of an impact wrench drive system.

It may be helpful to visually demonstrate the difference between a standard impact wrench drive system having a square-shaped anvil/socket connection, such as the impact wrench drive systems depicted and modelled in FIGS. 6-8, and a dynamically tuned and optimized ideal system. The demonstration charts the energy that is contained in each element of the impact wrench drive system at any time during the energy transfer period. As depicted in FIG. 14, the performance of the standard impact wrench system is plotted for Energy versus Time. From the chart, it is apparent that when the hex spring ($k_1$—star-marked dashed line) is at its peak, there is a noticeable amount of energy that still remains in the other components. At the time the hex (k1) reaches its peak, the anvil (k2—square-marked dashed line) still contains a significant amount of energy. This non-transferred energy is a source of inefficiency that can be remedied by the dynamic tuning of the inertia and stiffness elements in the impact wrench drive system.

Figure 15:
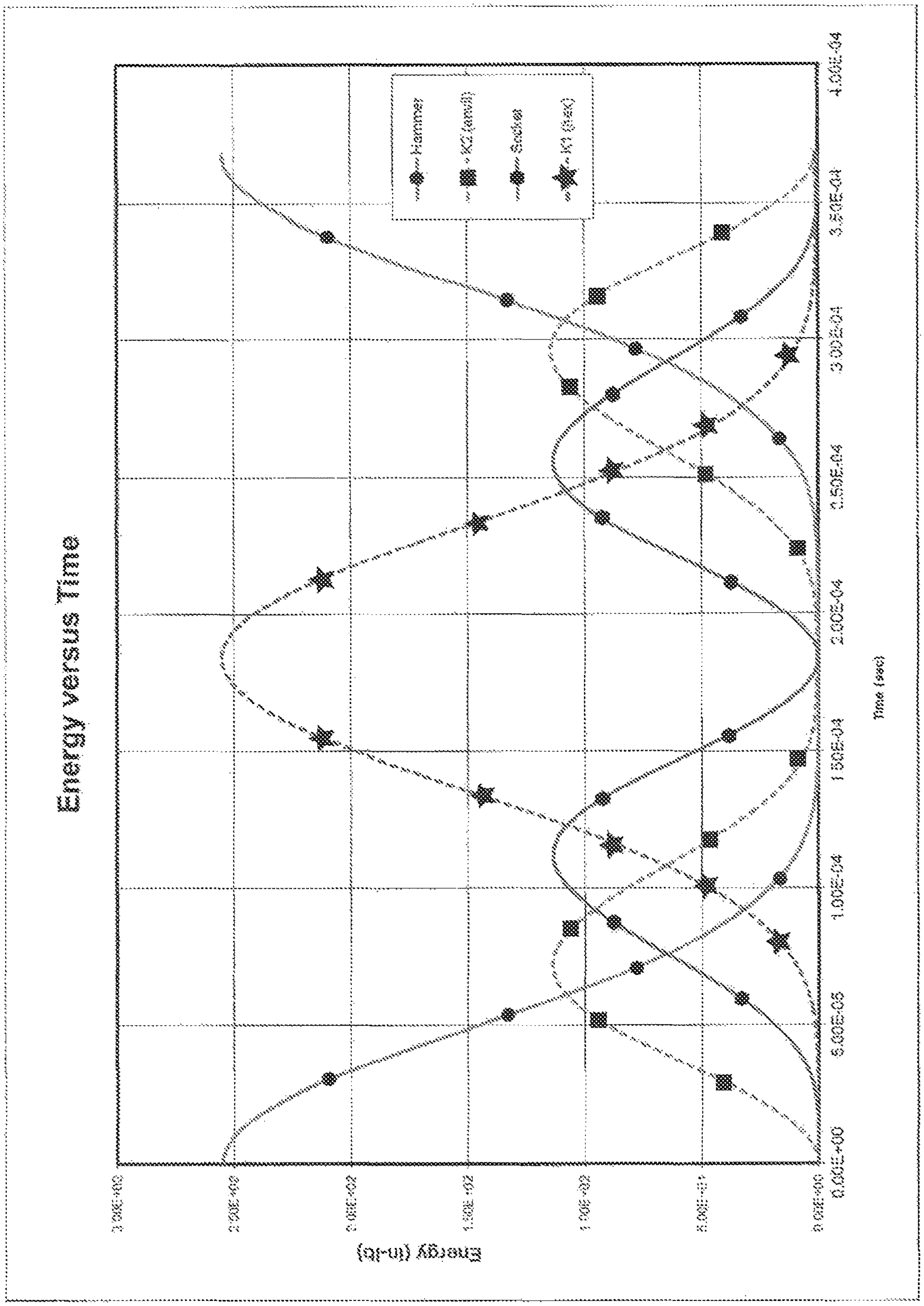
FIG. 15 depicts a plot of energy versus time pertaining to dynamically tuned and optimized components of an impact wrench drive system.

With regard to the dynamically tuned and optimized impact wrench drive system, FIG. 15 graphically depicts the performance of the tuned wrench via an Energy versus Time plot. In the optimized drive system shown in FIG. 15, the hammer, anvil and socket have all released their energy at the precise time that the hex (star-marked dashed line) reaches its peak. This notable that the peak is more than 100% greater than the standard tool output. This dynamically tuned impact wrench drive system is indeed “ideal,” as all the incoming hammer energy makes its way into the hex and then 100% returns to the hammer by t=3.5E-04 (circle-marked solid line). Those of ordinary skill in the art will appreciate that, in reality, some energy will be lost in both cases to friction. However, the dynamic tuning of the ideal case, in some ways, sets a bound on performance that provides input for practical real life tuning.

While the inertia of the socket can readily be increased or decreased through introduction of part-geometry changes, such changes may result in unwanted adverse effects on the overall weight of the tool and the ability to access tight spaces where bolts or other fasteners might be located. Achieving the optimum stiffness is much more challenging than the ideal case for at least two reasons: 1) there are many nut sizes in existence on which the impact wrench will likely be used, which presents the possibility for a wide range of stiffness ratios to a given tool—a decision must, therefore, be made regarding a hex size for which to optimize; and 2) the anvil stiffness, which includes the stiffness of the interface between the anvil and the socket can be quite low, as in the currently available common square-shaped interface impact wrenches, such as those with drive systems depicted and modelled in FIGS. 6-8, in comparison to the hex stiffness available in an ideal case. Lab experimentation has helped to clarify real world causality associated with modifications made to the anvil/socket inertia and stiffness ratios. For example, FIG. 16 depicts a Table 1 listing stiffnesses of interest and lab-measured ratios. Since the common square-shaped interface resides in series with the anvil body, the overall stiffness will always be lower than the lowest stiffness in the series, due to the reciprocal rule, as set forth mathematically below:

$$1/K_{Total}=1/K_{square}+1/K_{anvil}$$

$$K_{Total}=1/(1/K_{square}+1/K_{anvil}) \quad \text{Equations 7}$$

So, when the lab-measured data for a common Maurer mechanism impact wrench with a standard square-shaped interface (See FIG. 16) is applied to the equation, we get the following:

$$K_{Total}=1/(1/274{,}000+1/55{,}000)=46{,}000$$

In order to achieve an optimal stiffness ratio, the total anvil stiffness (including the interface with the socket) needs to be $4/3*K_1$. With regard to a 15/16" hex fastener, as set forth in the data listed in Table 1 of FIG. 16, $K_1=335{,}000$ in-lb/rad. Hence $4/3*K_1$ renders an optimal $K_{Total}$ of approximately 446,700 in-lb/rad. Since the square-shaped interface itself is much less than that, it is impossible to achieve the required stiffness even if the stiffness of the body of the anvil was increased 10 fold. Thus, the most effective way to achieve the required stiffness is to increase the interface stiffness well above the requirement for the total, so that the addition of the body of the anvil brings the total down to the optimal number. Lab testing has confirmed that a stiff interface, such as a spline interface, accomplishes this. Through a Finite Element Analysis, a 24 tooth 20/40 pitch spline has been determined to have a measured stiffness of approximately 1,800,000 in-lb/rad. Hence, using Equation 7 and solving for the anvil stiffness, the stiffness of the anvil body can be determined as follows:

$$1/K_{anvil}=1/K_{Total}-1/K_{spline}$$

$$K_{anvil}=1/(1/K_{Total}-1/K_{spline})$$

$$K_{anvil}=1/(1/446{,}700-1/1800K)$$

$$K_{anvil}=\text{approx. } 594{,}000 \text{ in-lb/rad}$$

Figure 17B:
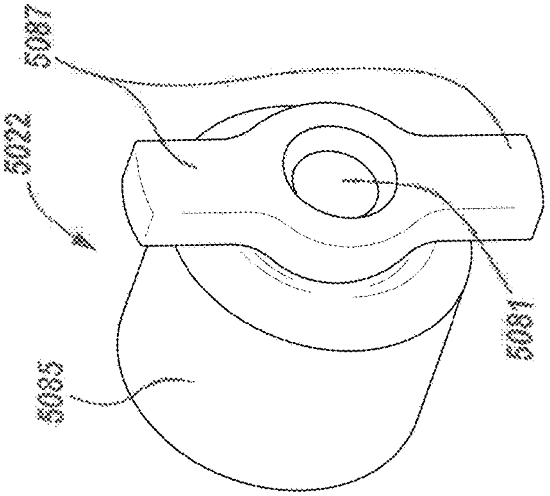
FIG. 17B depicts a rear perspective view of an embodiment of a dynamically tuned anvil.
Figure 17A:
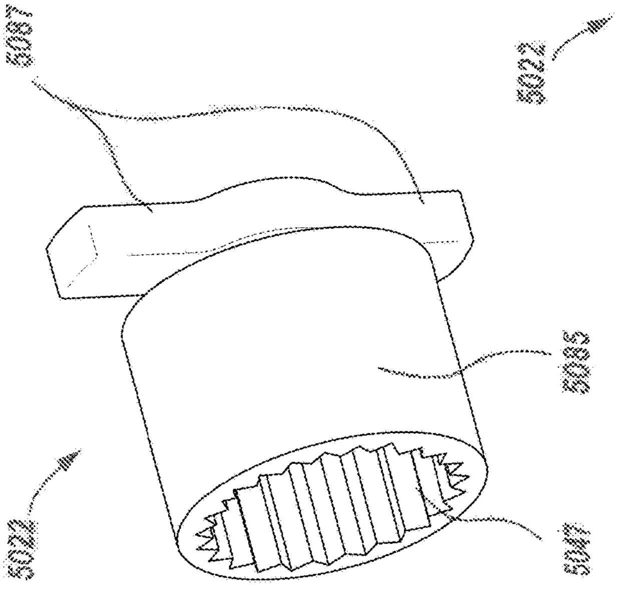
FIG. 17A depicts a front perspective view of an embodiment of a dynamically tuned anvil.
Figure 17C:
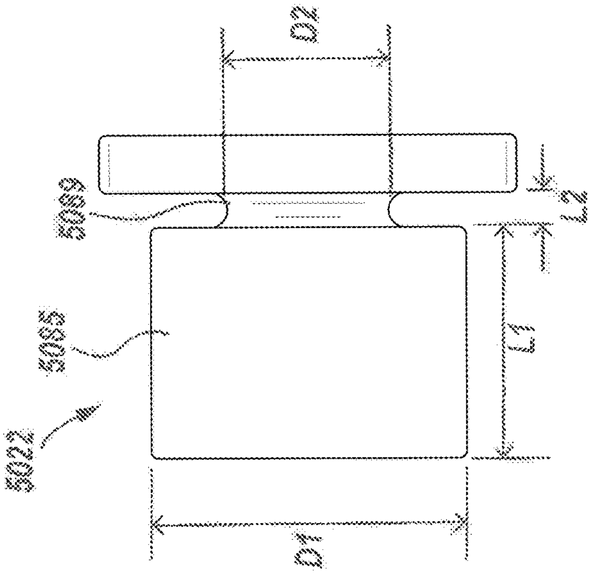
FIG. 17C depicts a side view of an embodiment of a dynamically tuned anvil.

As determined, this stiffness is a significant increase over the standard anvil. However, a common cordless impact mechanism, often referred to as a "Ball and Cam" type mechanism, lends itself well to the geometry changes required to meet this requirement. The jaws of the corresponding hammer are spaced relatively far apart, which allows the anvil diameter to increase to not only better support the jaws, but a larger anvil diameter also increases the associated anvil inertia, thereby tuning the device and meeting the optimal inertia requirement. One such tuned anvil 5022 embodiment is depicted in various perspective views in FIGS. 17A-C. As embodied, the tuned anvil 5022 includes an internal splined socket mating recess 5047 (See particularly FIG. 17A), which is configured to receive an externally splined portion of a tuned socket. While this embodiment specifically includes 24 spline teeth having a 20/40 pitch, those of ordinary skill in the art will appreciate that the tuned socket may have varying numbers of spline teeth with differing pitches. The diameter D1 surrounding the splined socket mating recess 5047 may function as a bearing journal 5085, at a much larger diameter than a standard anvil 1022 (see FIGS. 1-4B), and also as a portion of the $m_1$ inertia for the tuning process. The jaws 5087 may be structurally and functionally similar to jaws 1087 of a standard ball and cam anvil 1022. The neckdown area 5089, clearly depicted in FIG. 17C, serves to control the stiffness of the tuned anvil 5022. The diameter and length of the neck play a significant role in the stiffness of the tuned anvil 5022. The hole visible in FIG. 17B serves as a bearing journal to support other components of an impact wrench, in a manner similar to the functionality of a similar bearing journal in the standard ball and cam anvil 1022.

Figure 18:
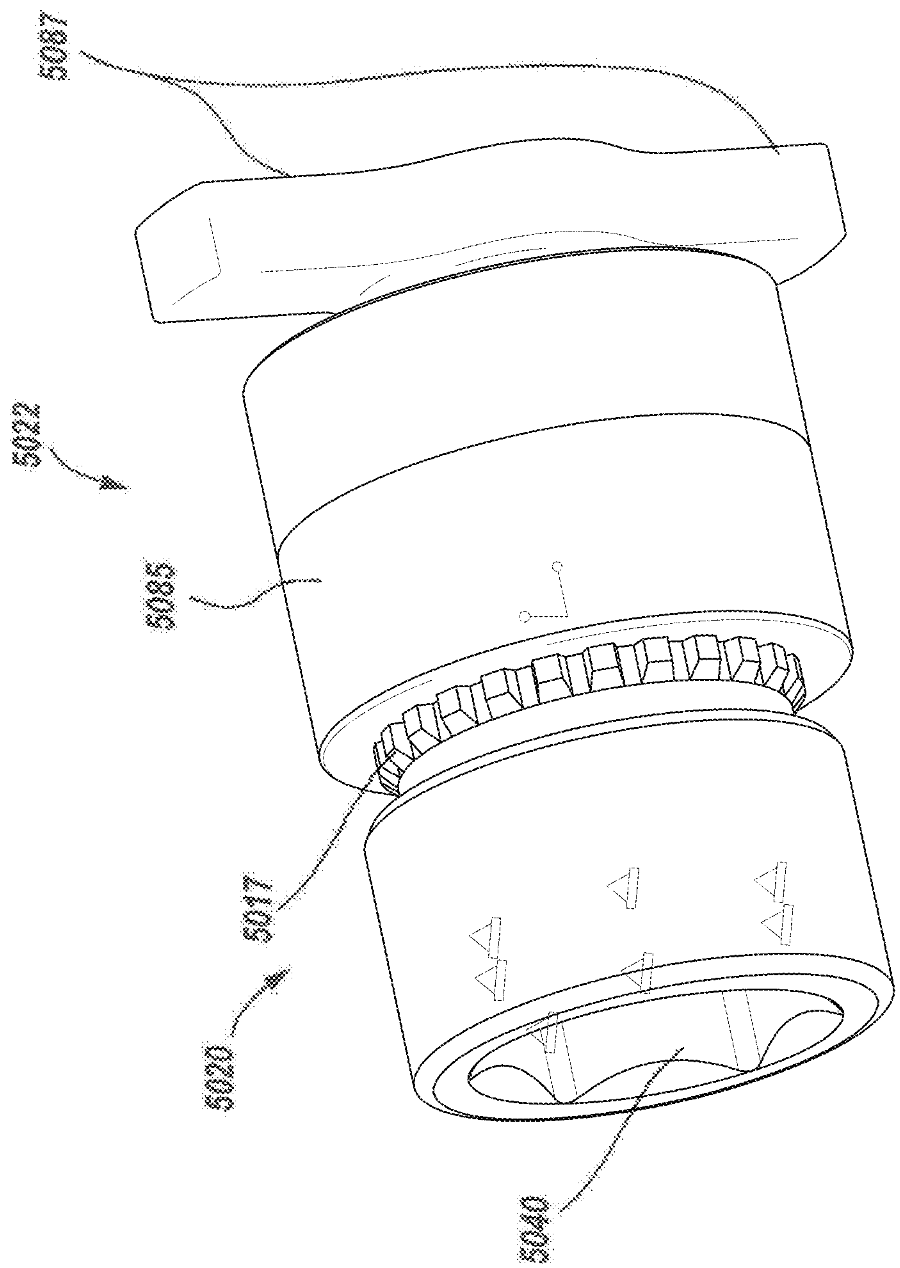
FIG. 18 depicts the mating engagement of dynamically tuned embodiments of an anvil and a socket.

A tuned anvil 5022 is depicted, in FIG. 18, as engaged with a correspondingly tuned and configured socket 5020. The socket 5020 may have an externally splined portion 5017 configured to mate with the internally splined socket mating recess 5047 of a tuned anvil 5022. The colors (or gradient shading) depicted in FIG. 18 represent the deflection data collected using a Finite Element Analysis program. The inertial sum of the socket 5020 inertia and the large diameter end of the anvil 5022 in front of the neck 5089 are determined using the optimization process described herein above. The inertia of the anvil can be increased by lengthening the spline portion of the anvil (L1 of FIG. 17C) and/or increasing the diameter (or thickness) surrounding the spline (Da, again of FIG. 17/c). In general, the greater the anvil inertia can be, the smaller and less bulky the sockets need to be. The trade-off of socket and anvil size with the increase in output needs to be evaluated on a case by case basis.

Figure 19:
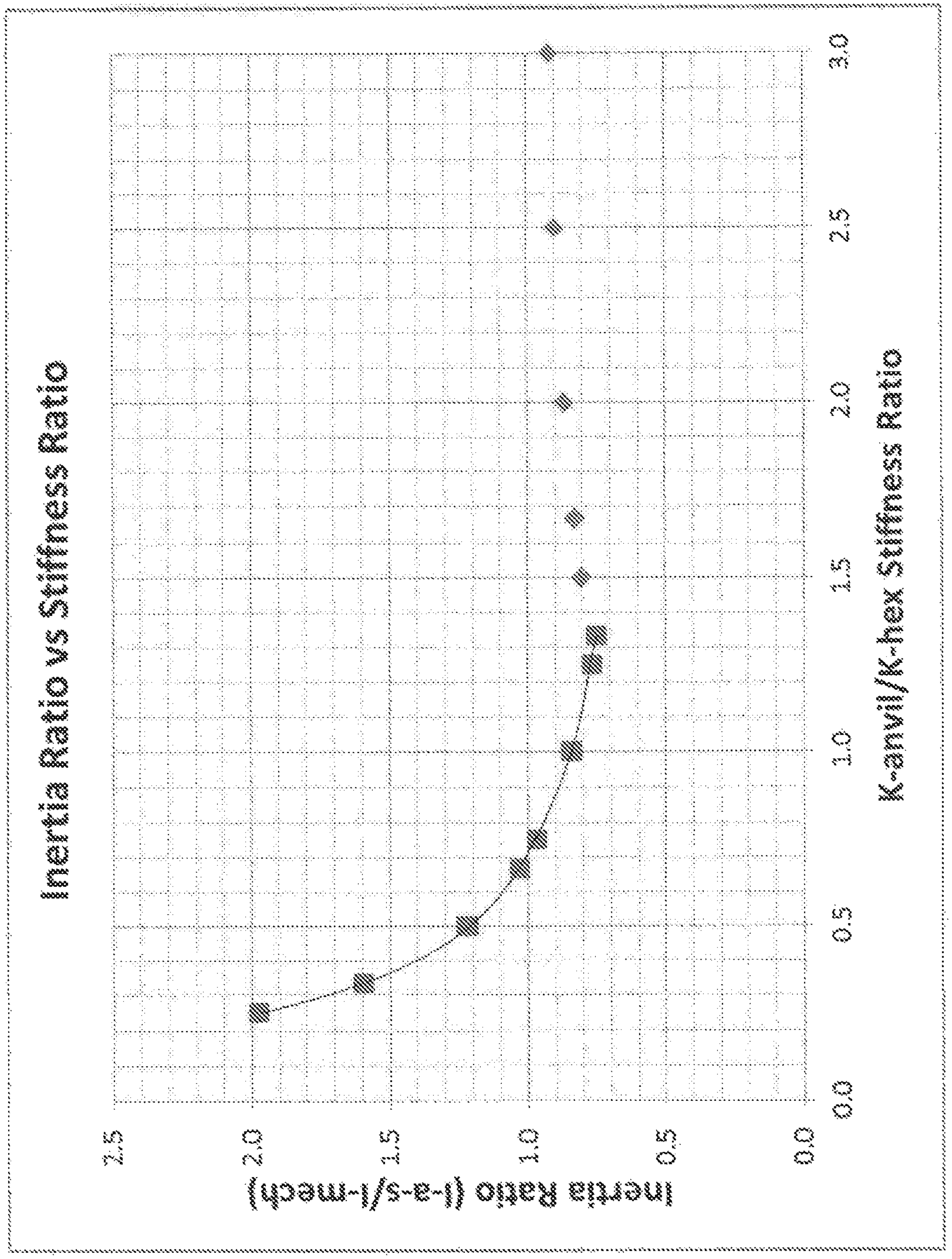
FIG. 19 depicts a plotted Inertial Ratio vs. Stiffness Ratio curve.

Dynamic impact wrench drive system tuning involves a determination, based on mathematical modelling as assisted by empirical data, of optimum trade-offs between inertia and stiffness. As depicted in FIG. 19, a plotted output is generated by numerically solving applicable differential equations at various inertias and stiffness levels using an iterative optimization algorithm based on knowledge gained from empirical data. The x-axis is the designed ratio of the anvil stiffness to the hex stiffness. The y-axis is for the Inertia ratio of anvil-socket combination to mechanism. When any three quantities are known, the fourth quantity can be determined by finding the intersection with the curve. Anywhere that is NOT on the curve has lower tool output and potentially more weight than it could otherwise have. For example, at a stiffness ratio of 0.5, the required Inertia ratio from the curve would be about 1.2. Mulitply the mechanism inertia by 1.2 and that is the target inertia for the $m_1$ body or, in the case of a spring oscillation model based tuning process, the optimal socket/anvil combination. Any inertia level above or below that level would result in lower output of the system. There are several things worth noting about the plotted inertial Ratio vs. Stiffness Ratio curve. In the region below 0.5 stiffness ratio, the curve is very steep and requires a large amount of added inertia to optimize. As the stiffness ratio increases, either by increasing anvil stiffness or decreasing the hex stiffness/size, the required inertia ratio for optimization drops significantly. Above the stiffness ratio of 1, the curve is much flatter and requires a relatively low range of inertia to be optimal. With respect to tuning an anvil, a hex stiffness ratio of precisely 1.33 (or a reciprocal hex-anvil ratio of 0.75) results in an optimal inertia ratio (anvil-socket to mechanism) of 0.75 and corresponds to the local minimum on the plotted curve. This numerical solution agrees with the closed-form solution where both are dynamically optimized simultaneously where:

$$m_1 = \frac{3}{4}m_2$$

$$k_1 = \frac{3}{4}k_2$$

Figure 20:
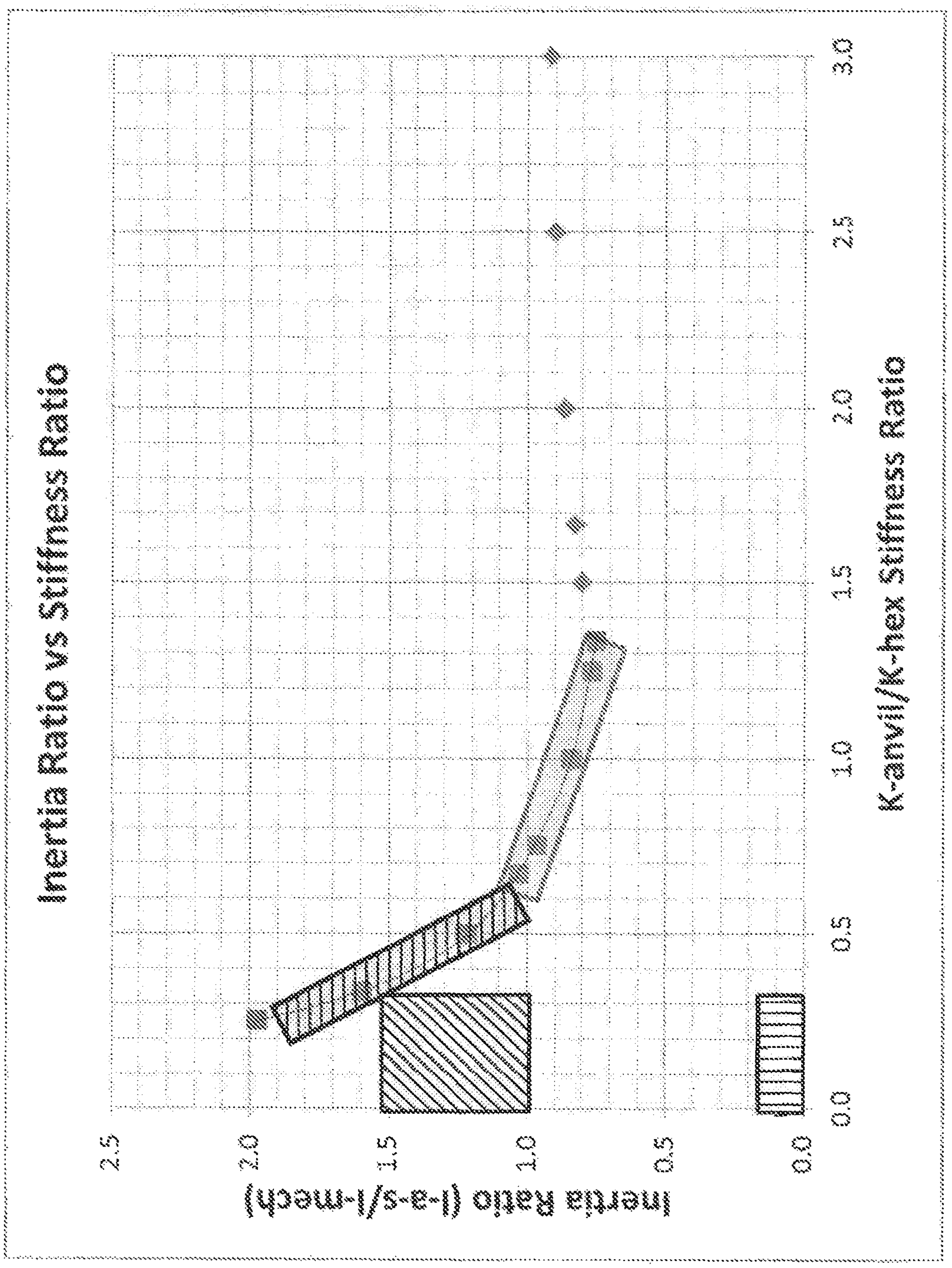
FIG. 20 depicts the plotted. Inertial Ratio vs. Stiffness Ratio curve of FIG. 19 and includes performance zones pertaining to operable functionality of various tuned and not tuned impact wrench drive systems.

The Inertia Ratio vs. Stiffness Ratio plot can be very insightful for tuning purposes, especially when utilized in conjunction with empirical data pertaining to impact wrench drive systems. For example, as depicted in FIG. 20, the vertically cross-hatched area in the same plot is where most common anvils and standard square-shaped sockets operate today. These offerings are nowhere near the optimal curve because the ordinary anvils are low in stiffness and typical sockets are very low in inertia relative to their mechanisms. A tuned power socket for standard square drive tools operates in the diagonally cross-hatched region. The anvils are the same (meaning the anvils are not optimized and include common square-shaped socket mating portions), but the inertia has been increased significantly and, for a narrow range of hexes, the inertia is perfectly tuned. The region that is lightly shaded is where dynamically tuned drive systems will likely operate most frequently, particularly with certain mechanism types, where the stiffness of the anvil can be increased to a point where the optimal inertia ratio is between 0.75 and 1.0 making the final tool power to weight ratio extremely hard to compete with. Where the anvil cannot be designed to be significantly higher in stiffness, the region designated by horizontal cross-hatching will likely be the target area for optimization.

When tuning impact wrench drive system performance through employment of spring-mass oscillation modelling, the Inertia Ratio vs. Stiffness Ratio plot can be used to determine the optimal inertia for ANY stiffness ratio that is achieved. There are performance advantages associated with moving the stiffness ratio as close to 1.33 as possible, so that the inertia can be as low as possible and still perform at the highest level. The stiffness of the interface between the socket and the anvil will determine the extent to which the required inertia can be split between the socket and the anvil. In the case of a square drive connection, both the model and empirical data have demonstrated that the connection is not stiff enough to treat the anvil and socket as a single mass and, therefore, the substantial part of the required inertia may be contained in the socket, such as in the design of the tuned Power Socket. With a stiffer connection, such as with the implementation of a spline drive connection, the inertia may be divided in any convenient manner between the two components thereby reducing the potential for reduced access due to the added material in the socket.

As set forth above, the ideal case is interesting, but it is the exception and not the rule. There are various reasons why the impact dynamics do not operate with all parameters at their optimum. Firstly, a user is likely to use an impact wrench on a wide range of hex sizes. Each hex size will exhibit a wide variety of stiffness behaviors. Large hexes will appear very stiff while small hexes will appear relatively soft. Estimating what stiffness to expect for a given hex size is a matter of experimentation and empirical testing. In the end, however, there will likely end up being hex sizes for which the tool is not fully optimized. As depicted in FIGS. 19 and 20, the shape of the optimality curve, however, allows the designer to optimize at a relatively large hex size resulting in a very close to optimal condition for hex sizes below the hex for which the tool was optimized. Secondly, there are physical limitations to the anvil for each mechanism that may preclude the achievement of high levels of stiffness. For example, long and thin rods can typically be made stiffer by becoming shorter and/or larger in diameter. In the case of the anvil depicted in FIG. 5, which is very often used in air driven impact wrenches, the stiffness is limited by the portion of the anvil with the jaws that has a relatively small diameter and is much longer than it is in diameter. Thirdly, there are losses in the system that will always remove energy and cause the idealized equations to over/underestimate the parameters. The model can be refined to include these elements over time to enhance its prediction capability. For anvils like the standard Maurer mechanism depicted in FIG. 5, the optimum stiffness may not likely be achieved for many of the of hex sizes on which it was designed to operate. For sub-optimal stiffness, the differential equations mentioned earlier may be solved numerically omitting the assumptions that the potential and kinetic energy contained in the hammer, anvil and socket are all zero when the hex energy is at its peak. It becomes an iterative and dynamic optimization process that may take into consideration the known quantities of hammer inertia, initial hammer velocity, designed anvil stiffness and prescribed hex stiffness to drive the unknown quantity of socket inertia to maximize the $k_1$ torque.

The spring-mass oscillation model incudes assumptions requiring the hammer, anvil, socket and hex nut fastener to be in contact for the duration of the impact event. Even if the forces arise during the simulation, the math of the model does not contemplate the separation of the component elements. Test data has revealed that this is actually a relatively rare case in actual practice, but certainly a possible and potentially bounding case.

Momentum Model

There are several other possible combinations of state of contact that can affect the optimization of the inertia and stiffness parameters of an impact wrench drive system under a designer's control. The ability of the components to disengage from each other is commonly afforded by the loose fits between the anvil and the socket as well as between the socket and the hex nut. The loose fits are, to some extent, required in order to allow for manufacturing variation and ease of repeated and intended assembly and disassembly during normal use. These loose clearances or gaps between the impact wrench drive system components are critical to consider with regard to the energy transfer abilities of the drive system due to their more common presence at the time when hammer contact with the anvil is initiated.

Figure 21:
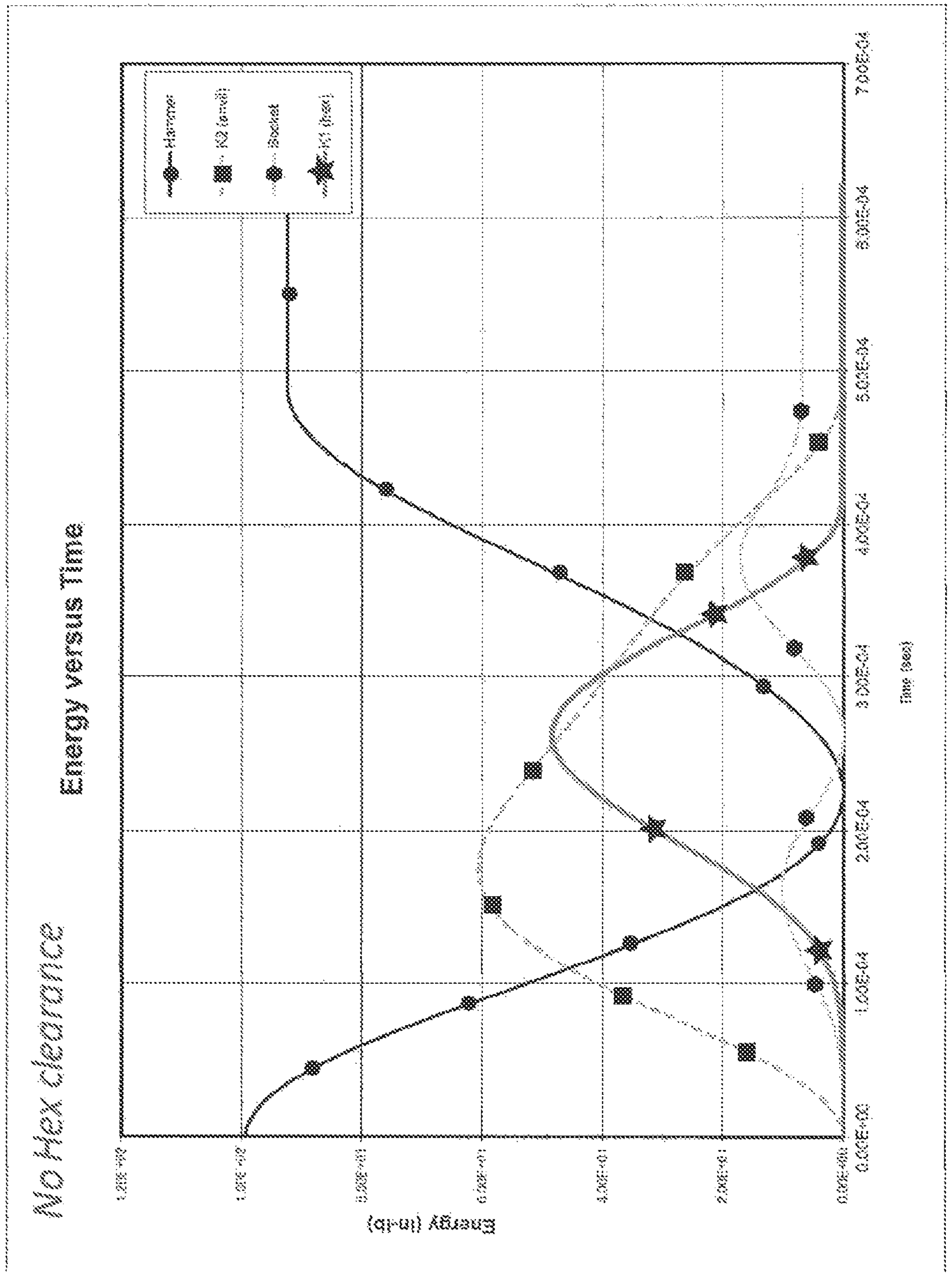
FIG. 21 depicts a plot of Energy versus Time, when there is no hex clearance between components.
Figure 22:
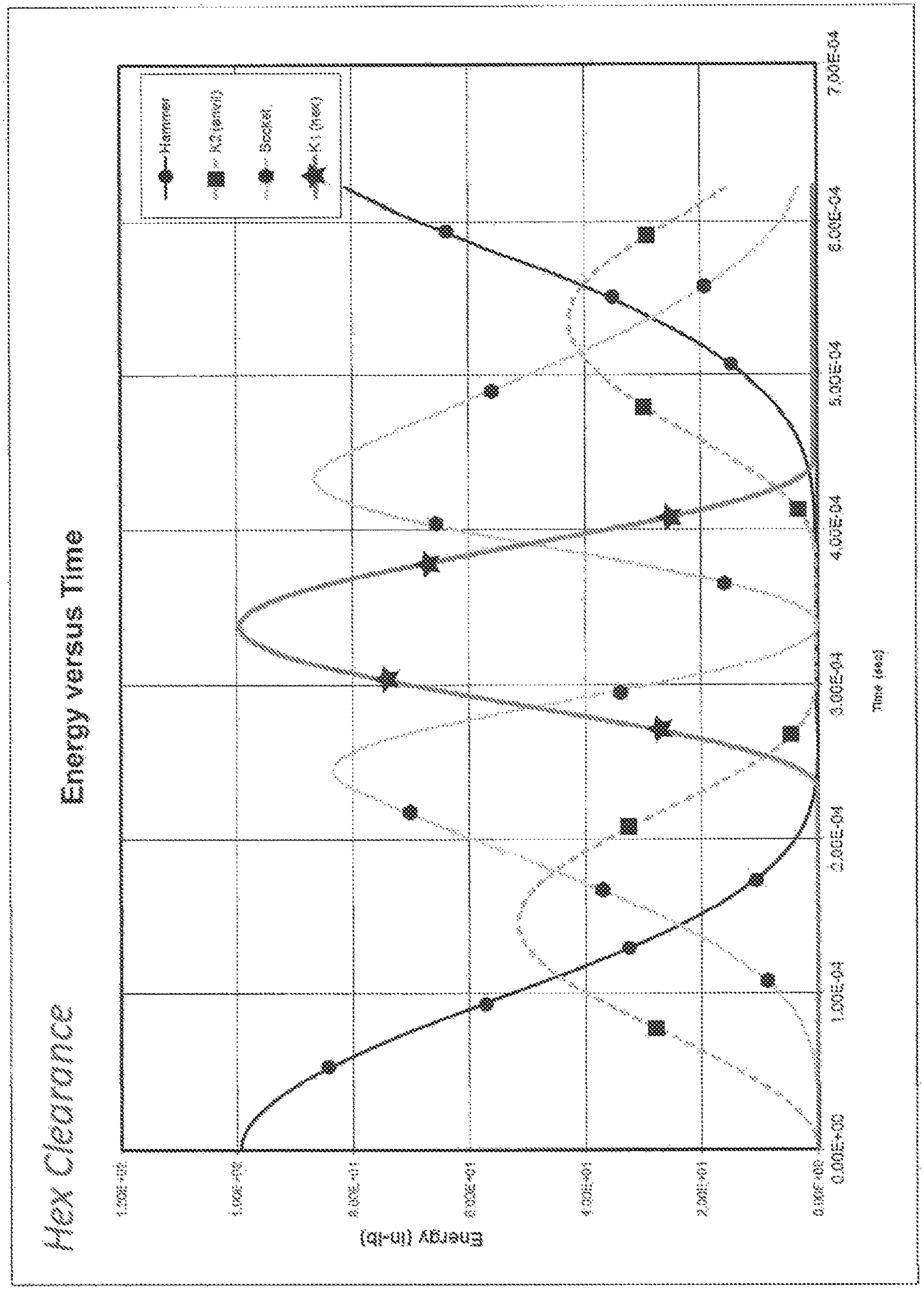
FIG. 22 depicts a plot of Energy versus Time, when there is hex clearance between components.

The clearances between the impact wrench drive system components have an important role in the timing of the energy transfers that occur between the parts. In this momentum model analysis, it is helpful to think of the impact event, not as an instantaneous or discontinuous change in state, but rather a motion defined by rapidly changing accelerations that depend on what is in contact at that time. In the spring-mass oscillation model, the energy that each component contains during the impact event was described. In a zero-clearance scenario, as the spring-mass oscillation model described, there can be energy harbored in the various components at the time when it is desired for all of the energy to arrive at the interface between the socket and the nut. The harbored energy arrives late (if at all) and is unable to do any valuable work on the nut. In a clearance gap, or momentum model, scenario where there is an angle through which the socket (or anvil) is required to cross before any contact occurs, there can be substantially more time for the energy transfer between the bodies to occur BEFORE the nut/socket interface reaches its peak torque. A depiction of how the energy contained in the hammer, anvil, socket and hex at any given time for a given set of design and initial condition parameters is depicted in FIGS. 21 and 22. In particular, FIG. 21 depicts a representation with all components in contact and unable to disengage, while FIG. 22 introduces a large gap between the socket and the nut and allows all components to separate when the forces allow it to occur. It is notable that, as plotted in FIG. 21, when the star-marked solid line associated with $k_1$ reaches its peak, other components still contain energy. Yet, as plotted in FIG. 22, when the star-marked solid line associated with $k_1$ peaks, all other levels are zero. Note also that the peak of the star-marked solid line associated with $k_1$ is higher and occurs later in time than the peak in FIG. 21.

Figure 23:
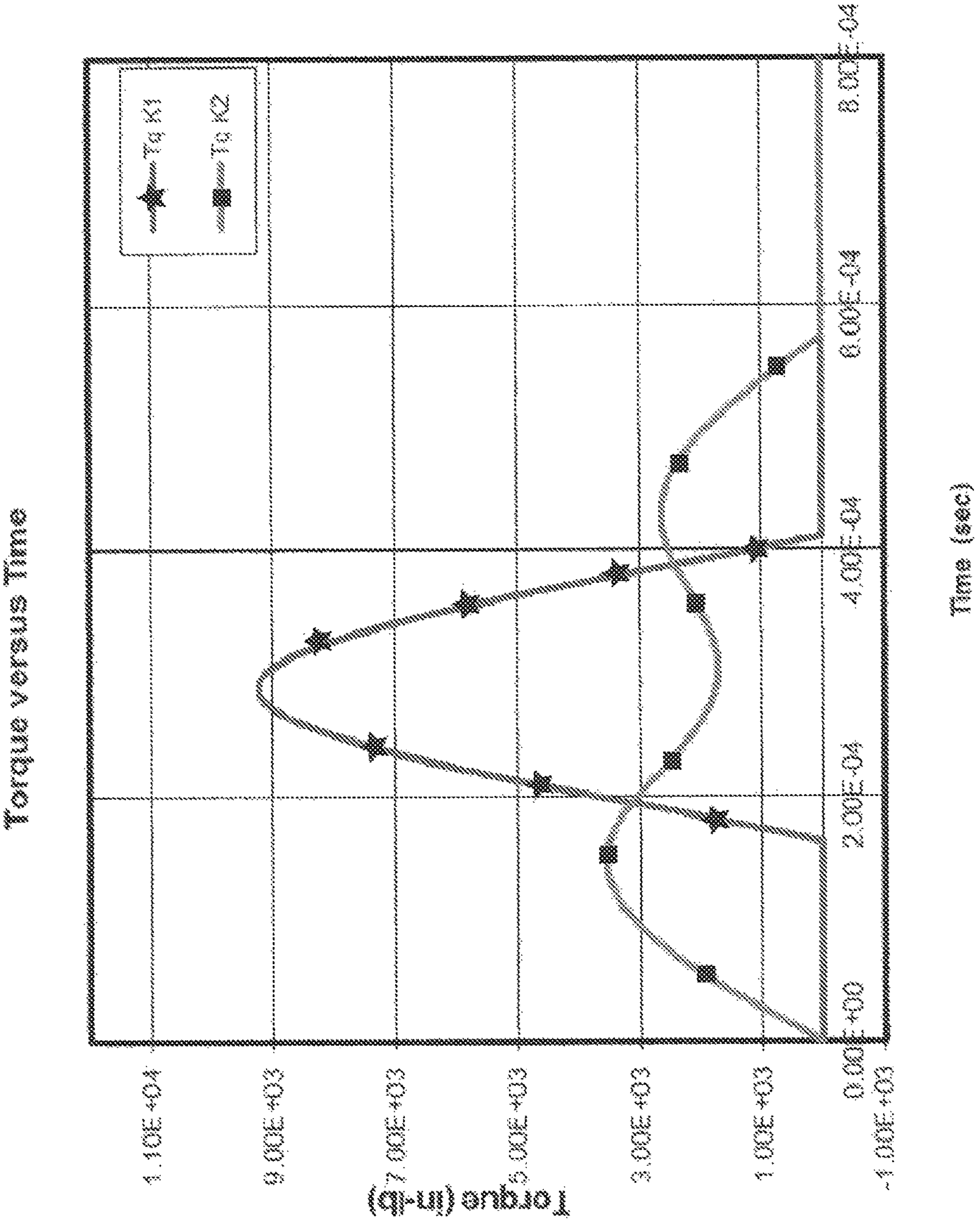
FIG. 23 depicts a plot of Torque versus Time, for a non-stiffened anvil connection.
Figure 24:
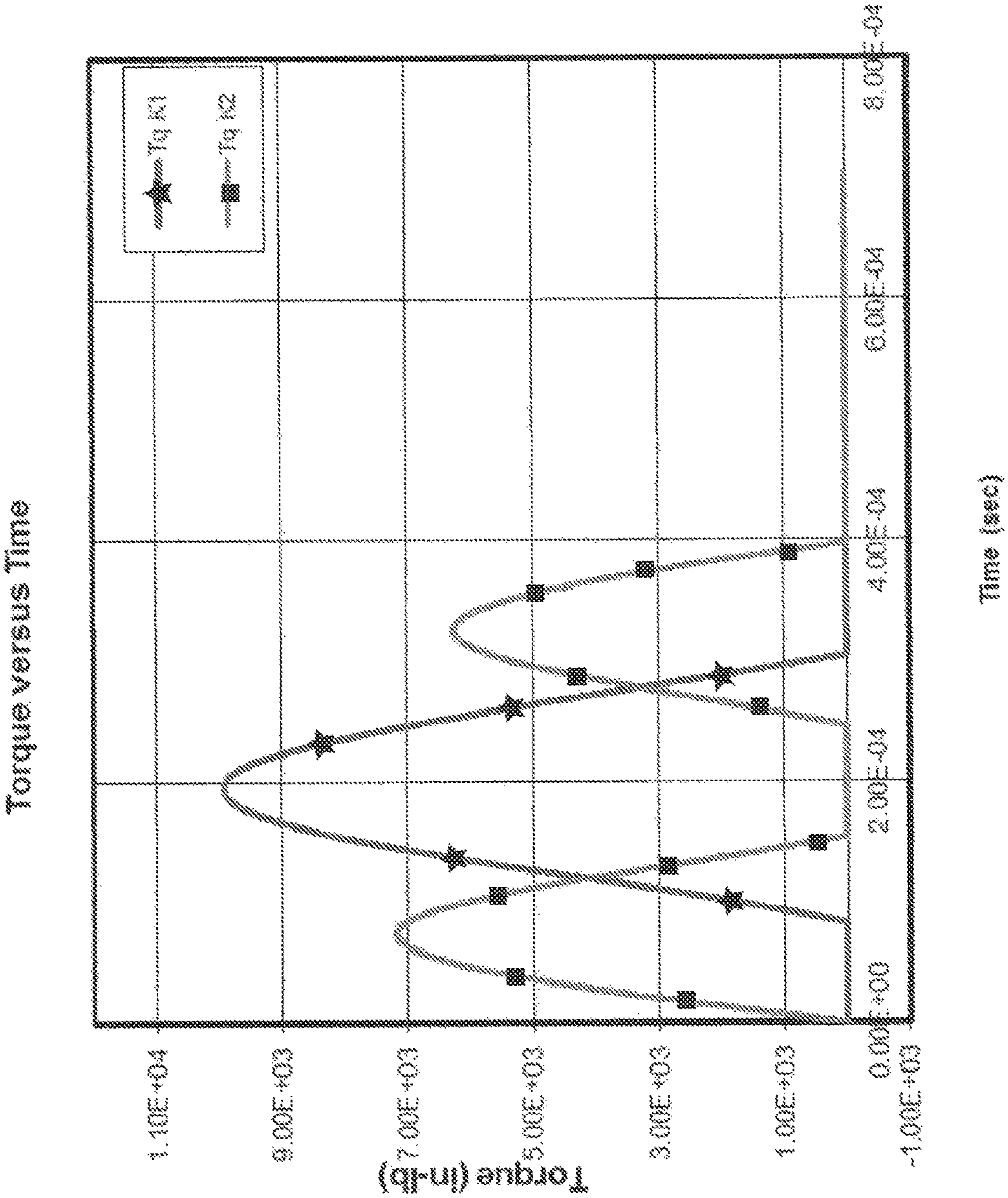
FIG. 24 depicts a plot of Torque versus Time for a stiffened anvil connection.

The state of the clearance or gaps between the driving interfaces of the impact wrench drive system components is not currently controlled and is nearly random. However, the effect of the clearances on the optimization of the system is important. When there is time for full transfer of energy to take place, the optimization actually simplifies greatly especially if that time can be assured. From the spring-mass oscillator model, it has been established that the anvil stiffness has a distinct effect on the timing of the energy. This is a powerful parameter to use in order to improve how quickly and completely energy is transferred in the case of very low or zero hex clearance. FIGS. 23 and 24 depict plots of the torque applied to the anvil (square-marked line) and the hex (star-marked line) to better show the timing of those peaks. The plot particularly depicted in FIG. 23 is a simulation with a small clearance in the hex and shows that the anvil is still deflected, and harboring energy, when the hex ($k_1$—star-marked line) peaks. The deflection of the hex "interrupts" the deflection of the anvil and reaches a peak before the anvil has released all its energy and has a predictable (but difficult to measure) interaction with it. The plot depicted in FIG. 24 shows the same hex clearance and an anvil that is about 4 times stiffer. The anvil (square-marked line) deflects to about 7000 in-lb and completely unloads prior to the hex ($K_1$—star-marked line) peak that occurs at about 2.00E-4 seconds. The return of the anvil to the undeflected state indicates a separation or disengagement of the hammer from the anvil and an assurance that the anvil is not harboring significant potential energy during that disengagement. The model suggests that there is a minimum anvil stiffness required to achieve disengagement, and therefore complete energy transfer, for each state of hex clearance for any system. The incentive for using the minimum anvil stiffness is the reduced anvil torque (peak of the square-marked line) that the anvil has to be designed to durably withstand.

Figure 25:
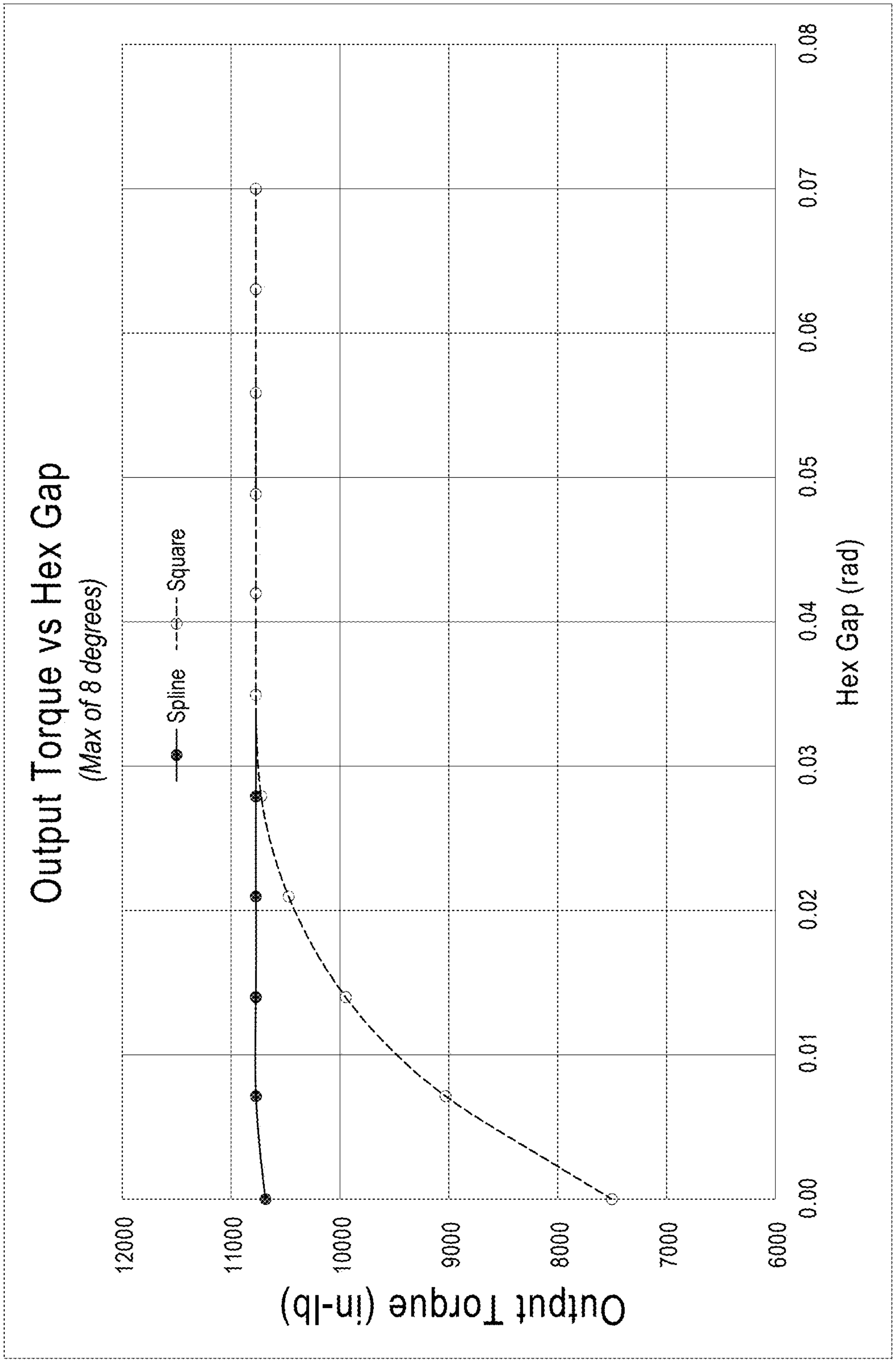
FIG. 25 depicts a plot of Output Torque vs. Hex Gap comparing a stiffened spline connection and a non-stiffened standard square-shaped connection.

A plot of simulated torque output as the clearance in the hex, called "hex gap" increases is depicted in FIG. 25. The plot shows that output of a dynamically tuned high stiffness spline drive anvil (solid line) is much less sensitive to the hex gap than the tuned low stiffness anvil (black dashed line). While anvils are both "tuned" to some degree, this plot assumes that the anvil stiffness was not part of the tuning process. Since the hex gap is very random, any given impact event will have output somewhere along these curves. The final performance will be some cumulative effect of all points achieved with a "ratcheting" effect in the case of a bolt tightening. The "ratcheting" effect occurs when the higher energy impacts are more effective even though they represent the minority of impacts. Obviously the flatter this curve is, the less scattered the productivity of the impacts will be and overall the tightening will achieve a higher torque.

The presence of clearance in the hex also effects the optimization of inertia. Whether the anvil stiffness is able to be increased or not, if separation between the anvil and the hammer is the predominant type of impact event, then the theories of collision and momentum will apply. Recalling the energy accounting and timing discussion of harbored anvil energy at low anvil stiffness, it is desirable to ensure that the hammer does not harbor energy (kinetic, in this case) when the torque in the hex reaches its peak. Otherwise, the energy is considered late and fails to contribute to the work done on the nut. Therefore, for optimal performance, the velocity of the hammer must be zero when the peak of the hex is reached. Assuming that other conditions are favorable for a disengagement scenario, such as a stiff anvil and/or an adequate hex clearance state, the proper inertia of the anvil/socket combination is equal to the inertia of the hammer. Consider the diagrams depicted in FIGS. 26-28 that use a billiards analogy to demonstrate the momentum factors.

Figure 26:
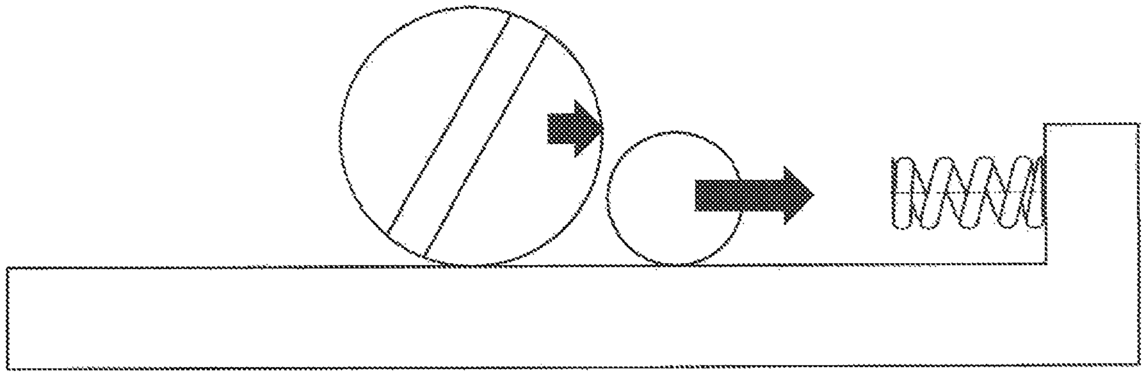
FIG. 26 depicts a billiard ball model of a larger mass striking a smaller mass.
Figure 27:
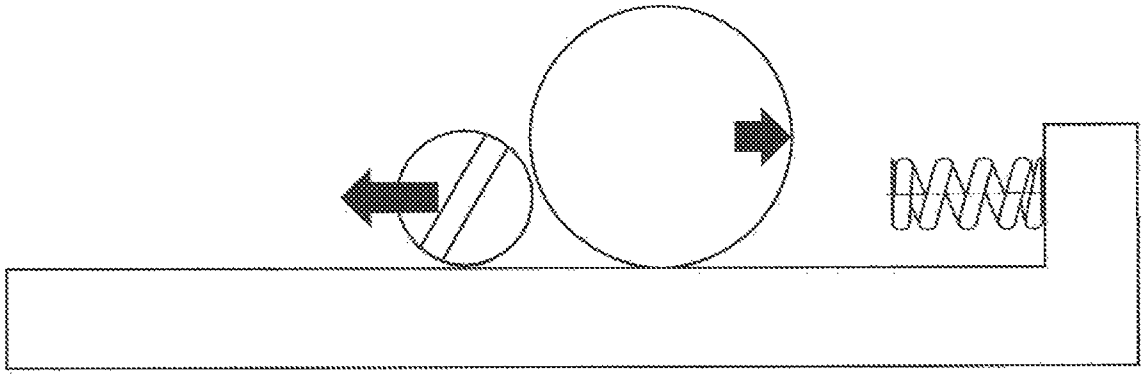
FIG. 27 depicts a billiard ball model of a smaller mass striking a larger mass.

As depicted in FIG. 26, a striped ball approaches the white ball that is stationary. The striped ball has a significantly larger mass than the white ball. After the striped ball hits the white ball, the state after impact is shown below. The white ball moves with a significantly higher velocity than that with which the striped ball approached due to its low mass. The striped ball does not completely come to a stop for the same reason. Momentum equations bear this out. Subscripts "s" and "w" in the following equations indicate striped and white ball color while "i" and "f" indicate initial and final conditions with respect to the time of impact.

$$m_s v_{si} + m_w v_{wi} = m_s v_{sf} + m_w v_{wf}$$

$$m_s(v_{si} - v_{sf}) = m_w(v_{wf} - v_{wi})$$

$$\frac{m_s}{m_w} = \frac{(v_{wf} - v_{wi})}{(v_{si} - v_{sf})}$$

The ratio of the masses dictates the ratio of the changes in velocities. Additionally, the continuing forward velocity of the striped ball and the spring toward which the white ball heads makes it likely that there will be additional contact between the balls before the striped ball's velocity becomes negative and heads in the opposite direction from which it approached. This bouncing behavior is highly inefficient and undesirable operation.

If the white ball is significantly smaller than the striped ball then the striped ball will have a continuing (positive) velocity in the original approach direction, as in FIG. 26. If the white hall is much larger than the striped ball, as in FIG. 27, then the striped ball will have a negative velocity and head the opposite way that it approached. Either way, the striped ball is harboring kinetic energy that is not reaching the spring on the wall.

The only way to get complete momentum and energy transfer is when the striped ball has zero velocity after the impact. Knowing that $V_{wf}$ and $V_{sf}$ are both zero and that $V_{si}$ is NOT zero, the only way for this to be true is for $m_s$ and $m_w$ to be equal therefore making $V_{wf}=V_{si}$.

$$\frac{m_r}{m_g} = \frac{(V_{gf} - \cancelto{0}{V_{gi}})}{(V_{ri} - \cancelto{0}{V_{rf}})}$$

Figure 28:
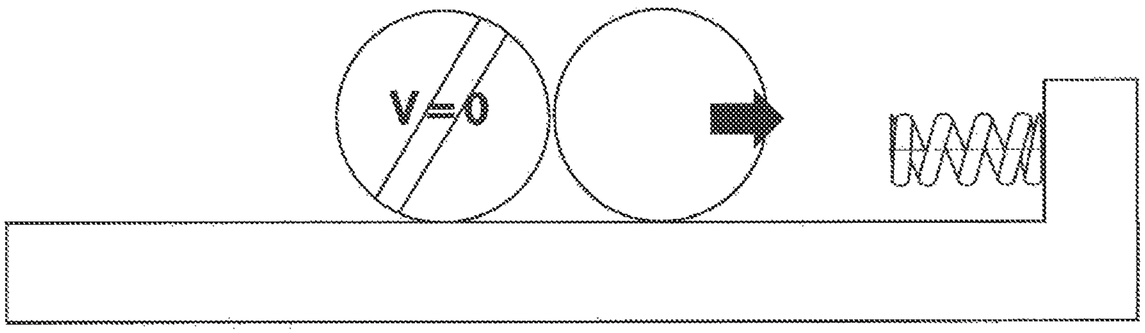
FIG. 28 depicts a billiard ball model of a mass striking another mass having similar inertial properties.

Therefore, for cases where the state of hex clearance is adequately large or the anvil is relatively stiff, the optimal socket/anvil inertia is equal to the hammer inertia, as depicted in FIG. 28.

Figure 29:
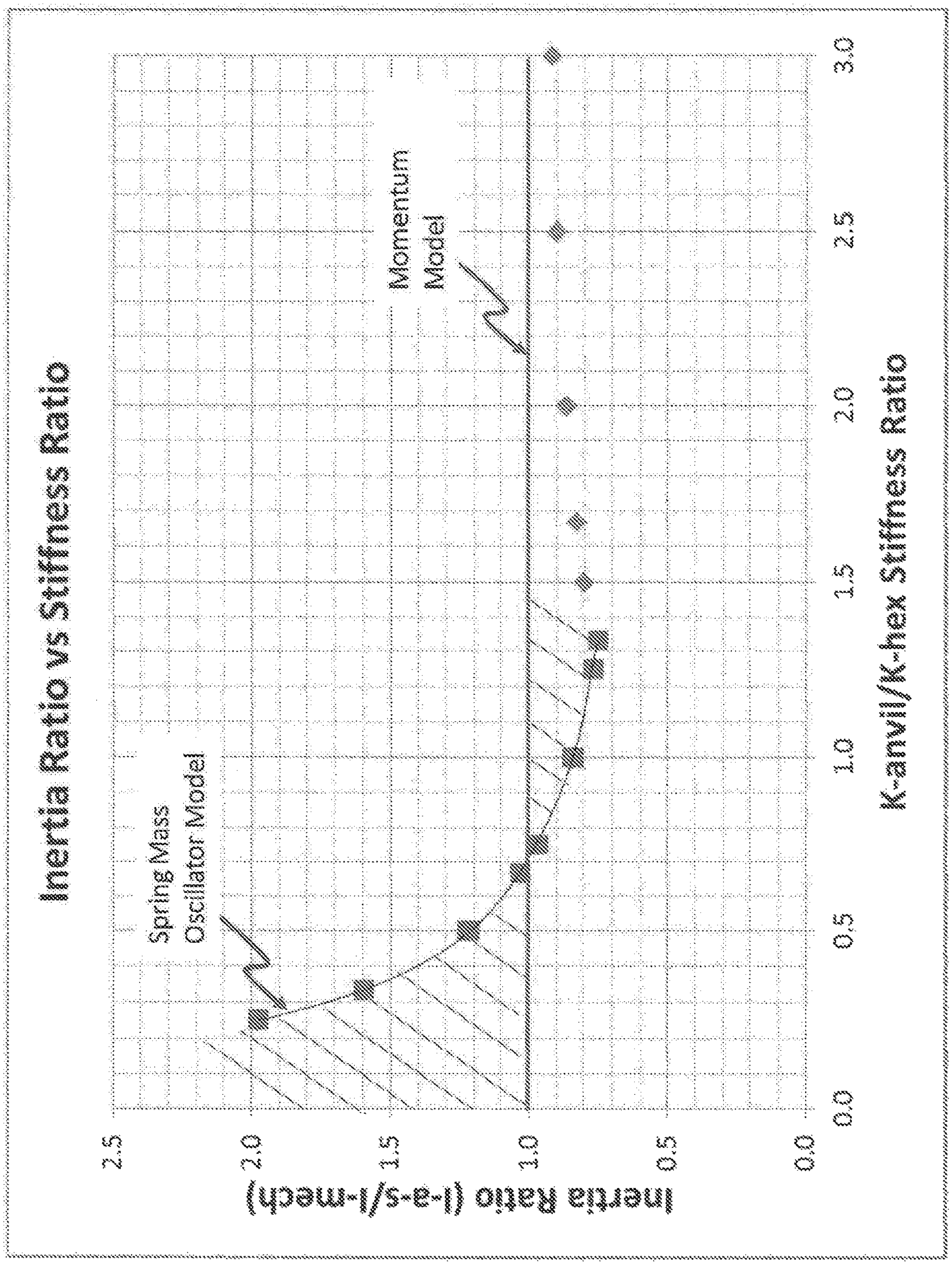
FIG. 29 depicts a plotted Inertial Ratio vs. Stiffness Ratio curve, along with optimal bounds derived through momentum modelling.

Since the hex clearance state at any impact event is relatively random, there will be conditions that will vary between a zero gap condition and an adequate gap condition. Prediction of performance will then have an upper bound defined by the momentum-based model and a lower bound defined by the spring-mass oscillation model. Likewise, the optimal inertia and stiffness will lie somewhere between the optimums dictated by the two models, as depicted in FIG. 29. If one condition is or can be made more likely, then following one model over the other might be advisable. It is therefore advantageous to attempt to choose parameters that would make the system less sensitive to the gap so that the upper and lower bound are very close and the application of one model over the other isn't as important.

Dynamically Tuned Impact Wrench Drive System Components

An impact wrench having dynamically tuned drive components may be capable of generating higher torque outputs, without increasing the weight, size or cost of the tool. The tuned drive components are optimized for inertial performance and stiffness, and are capable of transmitting energy more effectively and efficiently than standard impact wrench and socket designs. As such, a dynamically tuned impact wrench may solve the problem of achieving both high impact torques while operating a maximum motor operating points, and may also prevent erratic operation while being operated at low mechanism speeds. The tuned drive components permit successful performance in both modes of operation (max motor and low speed), while incorporating lighter weight componentry having smaller size requirements. Another advantage obtained from utilizing an impact wrench having dynamically tuned drive components is a substantially advanced combination of extreme impact power and untethered portability. For example, extreme impact power has been obtained before, but has always been limited to pneumatic powered applications, which require an air hose to be connected to the tool and thusly restricting tool mobility. Dynamic tuning of the drive components facilitates the integration of reduction gearing in the drive train and permits the motor to more effectively run at high speed. Moreover, a tuned wrench obtains the advantage of increased power to weight ratio, since standard parts can be reduced in size, while still maintaining qualities of high performance and durability.

When dynamically tuned, the socket and anvil are still separate components but are connected by an extremely stiff connection, such as a spline. The stiffness of the connection between the two drive components provides the following advantages over present solutions: 1) it causes the connected components to substantially behave as a single component such that the inertia of the anvil can simply be added to the socket inertia when determining optimal inertia. This means all the inertia required for optimal performance does not have to exist on the socket itself, but can be "hidden" further back inside the tool out of the immediate region of the fastener; and 2) a limiting factor in the overall stiffness of the anvil-socket combination has typically been the square shaped connection between the socket and the anvil. Increasing the socket/anvil connection stiffness allows the overall stiffness to be increased. As mentioned previously, increasing this stiffness reduces the inertia required to reach optimal performance. Tuning methodology, implemented through execution of at least one of two primary models (the spring-mass oscillator model and the momentum model) has rendered optimized performance characteristics with bounded ideal cases allowing for introduction and comparison or empirical test data, thereby facilitating part design optimized for multi-varied tool operation differences, such as looseness or clearance gaps between coupled components, as well as optimal structure changes in view of the balance between inertia ratios and stiffness ratios. For example, dynamic tuning reveals that the total stiffness of the anvil-socket combination including the interface between the two is in the region of 4/3 of the stiffness of the hex on which the tool is being used. Otherwise the inertia ratio for optimal performance at the minimum weight is a prescribed value in relation to the stiffness ratio.

Figure 30B:
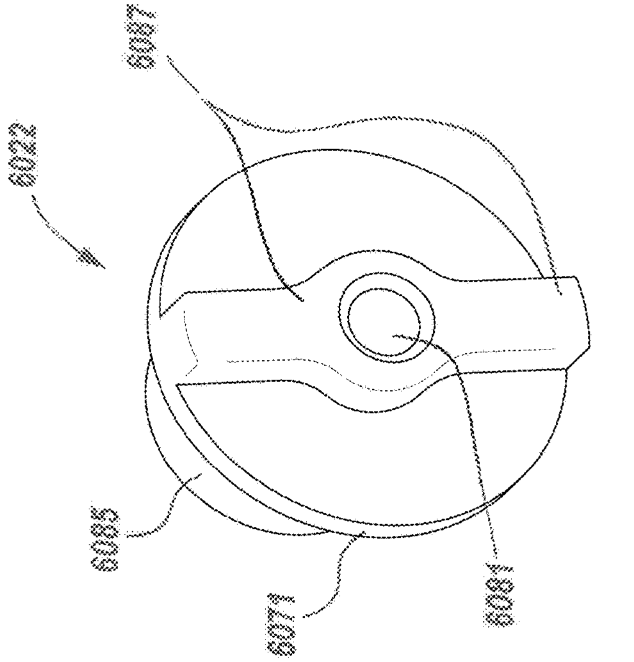
FIG. 30B depicts a rear perspective view of another embodiment of a dynamically tuned anvil.
Figure 30C:
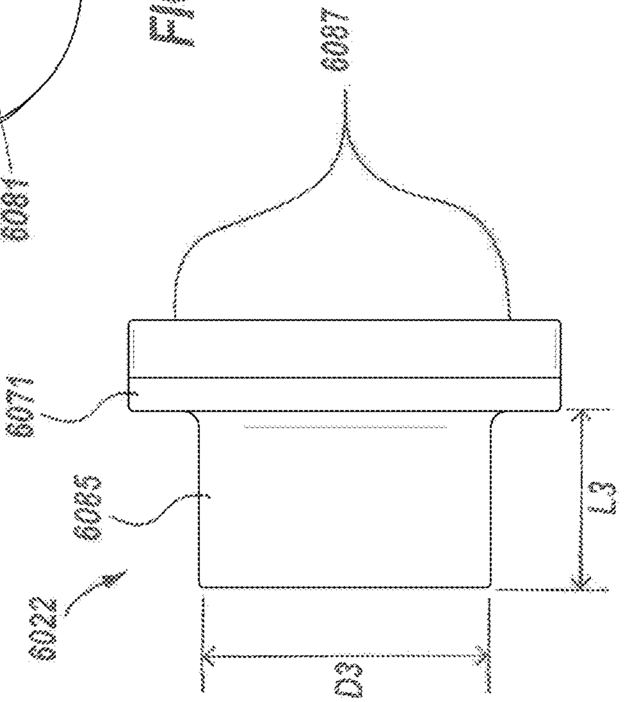
FIG. 30C depicts a side view of another embodiment of a dynamically tuned anvil.
Figure 30A:
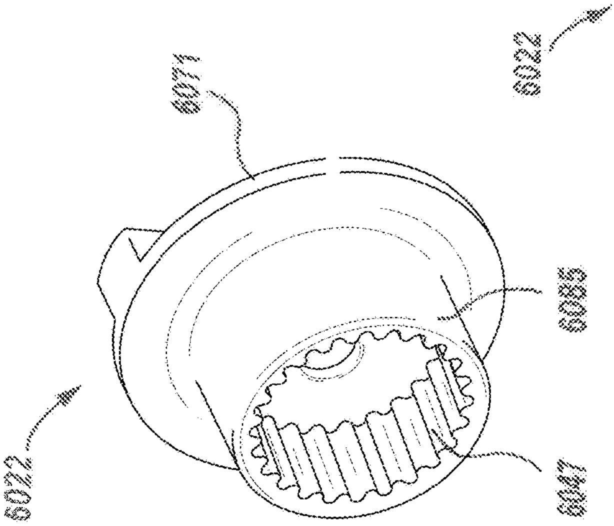
FIG. 30A depicts a front perspective view of another embodiment of a dynamically tuned anvil.

As depicted in FIGS. 30A-30C, and embodiment of a tuned anvil 6022 is provided for maximum stiffness and anvil strength. Unlike the tuned anvil 5022, instead of a "neckdown" region where the stiffness can be manipulated during design, this anvil embodiment has a supporting flange 6071 that serves to stiffen the jaws 6087 by supporting them on the downstream side. The jaws 6087 no longer cantilever from the central hub alone, but are connected to the flange 6071 thereby increasing the stiffness. The integration of the jaws 6087 with the flange 6071 also serves to increase the strength of the jaws 6087 and increase life expectancy of the component part. Dynamic tuning can still promote design changes with respect to the diameter D3 and length L3 of the socket engagement portion 6047, depending, to some extent, on modelled input and, corresponding test data.

Figure 31:
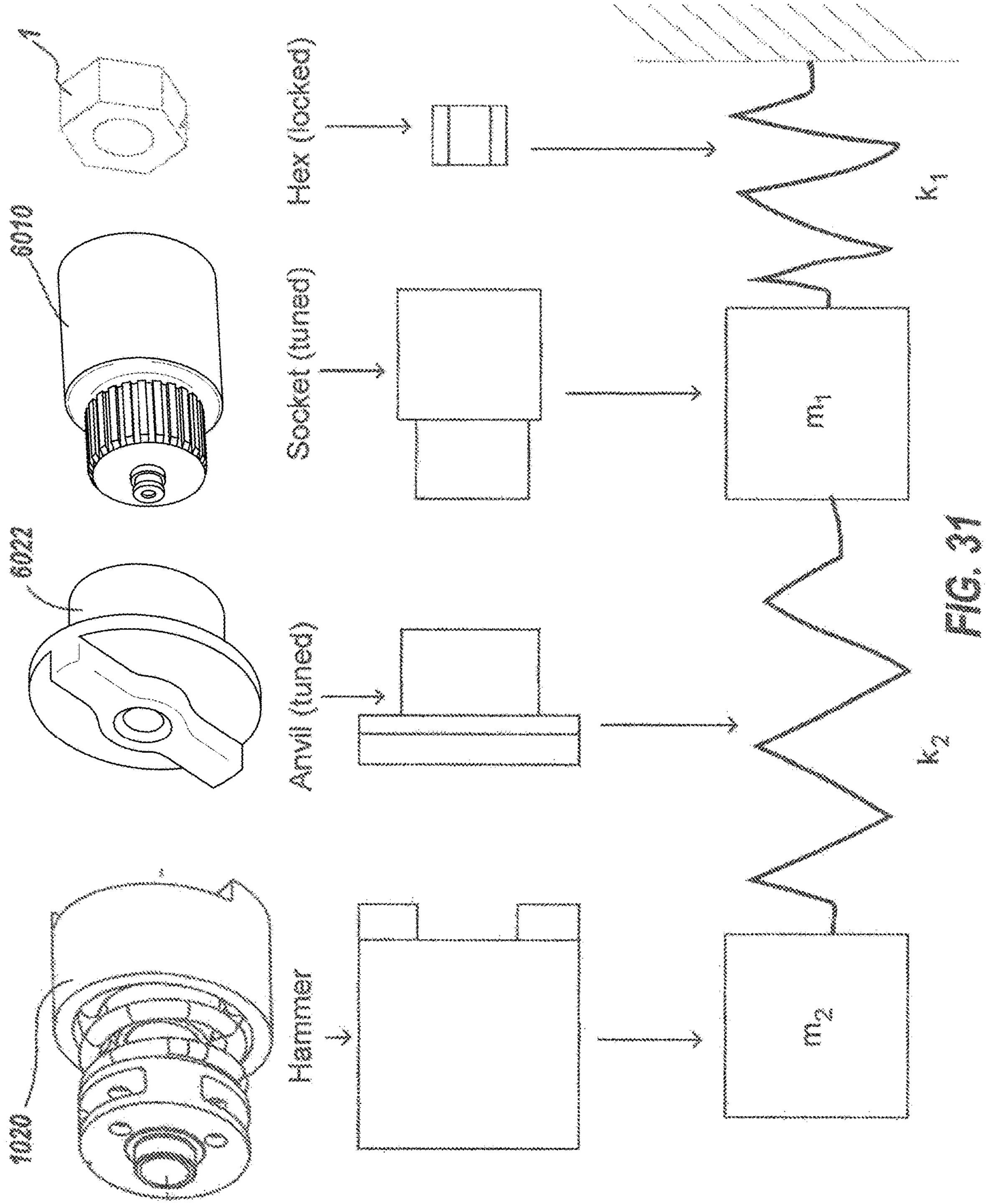
FIG. 31 depicts an exploded perspective view of a drive system of a common impact wrench having a tuned ball and cam mechanism, wherein the drive components are correlated with and respectively equated into a corresponding double oscillator model.

The tuned anvil 6022 may be mated to a correspondingly tuned socket 6010, as depicted in exploded view in part of FIG. 31. As shown the tuned socket 6010 includes a mating portion having exterior splines configured to mate with complimentary splines of the mating portion of anvil 6022. The addition of the sufficiently stiff anvil/socket coupling alters the diagram of FIG. 6 (associated with the standard ball and cam mechanism) to a model representing tuned components, as shown further in FIG. 31. Notably, the hammer 1020 and hex fastener 1 may remain unchanged.

Figure 32:
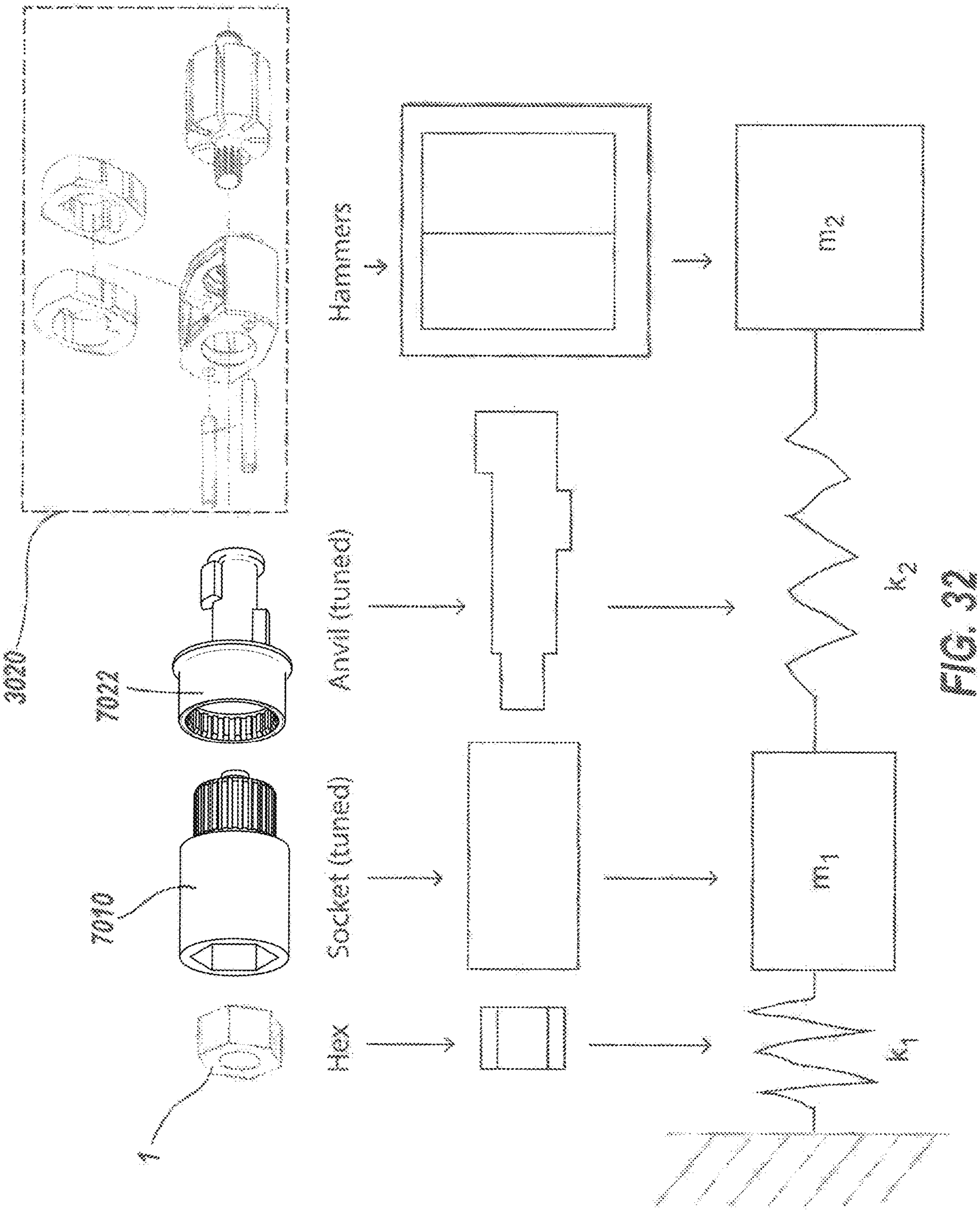
FIG. 32 depicts an exploded perspective view of a drive system of a tuned impact wrench having tuned anvil/socket combination and a standard swinging weight or Maurer mechanism, wherein the drive components are correlated with and respectively equated into a corresponding double oscillator model

Similar modeling alteration is depicted in FIG. 32, which shows a swinging weight or Maurer type hammer 3020 operable with a tuned anvil 7022 and correspondingly tuned socket 7010 to optimally drive a hex fastener 1. Again, as the hammer 3020 design can remain unchanged, while the impact wrench drive system components are tuned for optimal performance in view of the inertia ratio and stiffness ratio of the anvil/socket combination.

Figure 33:
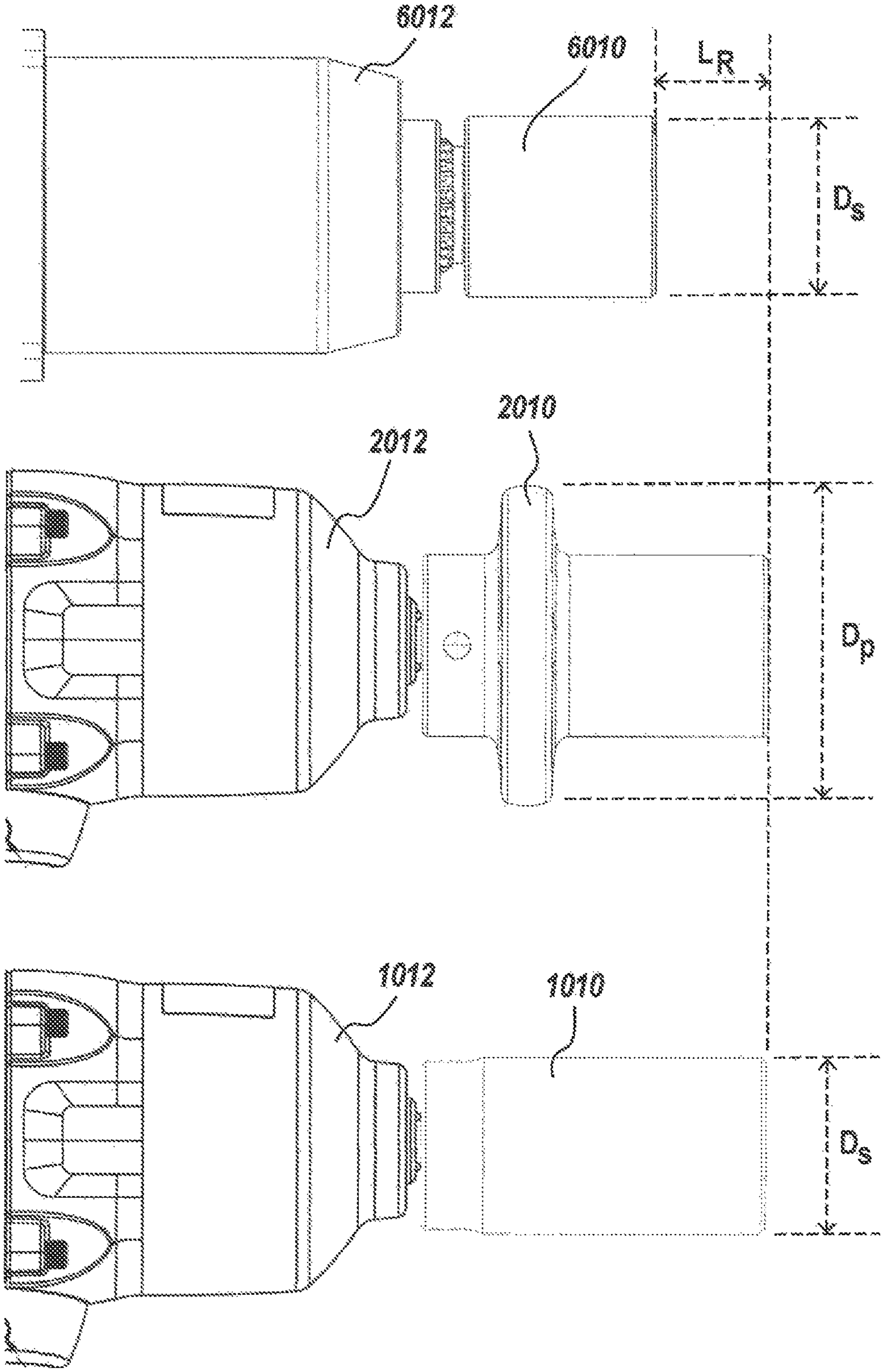
FIG. 33 depicts the structural differences of three cordless impact wrenches having differing tuned components.

As discussed, there are several advantages obtained from dynamically tuning the drive components of an impact wrench. For example, one such advantage pertains to desirous changes in the external dimensions of tuned components, as depicted in FIG. 33. Shown are three cordless (battery powered) impact wrenches. All three wrenches utilizes a common ball and cam hammer mechanism. However, dynamic tuning of other drive components renders benefits in both performance and look. As depicted, the middle impact wrench 2012 is engaged with a dynamically tuned socket 2010—a power socket—and therefore performs with much higher torque output. However, to obtain the higher torque output the socket 2010 has a greatly enlarged diameter $D_P$ attributable to the added annular inertia that renders higher performance. The top impact wrench 6012 takes advantages of dynamic tuning of not only the socket 6010, but also the anvil in combination with the socket. The result is two-fold: higher torque output and smaller tool footprint, because the length of the socket 6010 (in functional combination with the anvil 6022, not shown) is reduced by a distance $L_R$, while the diameter of the socket 6010 remains the same $D_S$, as a common socket 1010. Hence, the advantages of dynamic tuning are not only evident in the performance of the tool, but are readily seen with regard to the reduced size of the tool.

Figure 34:
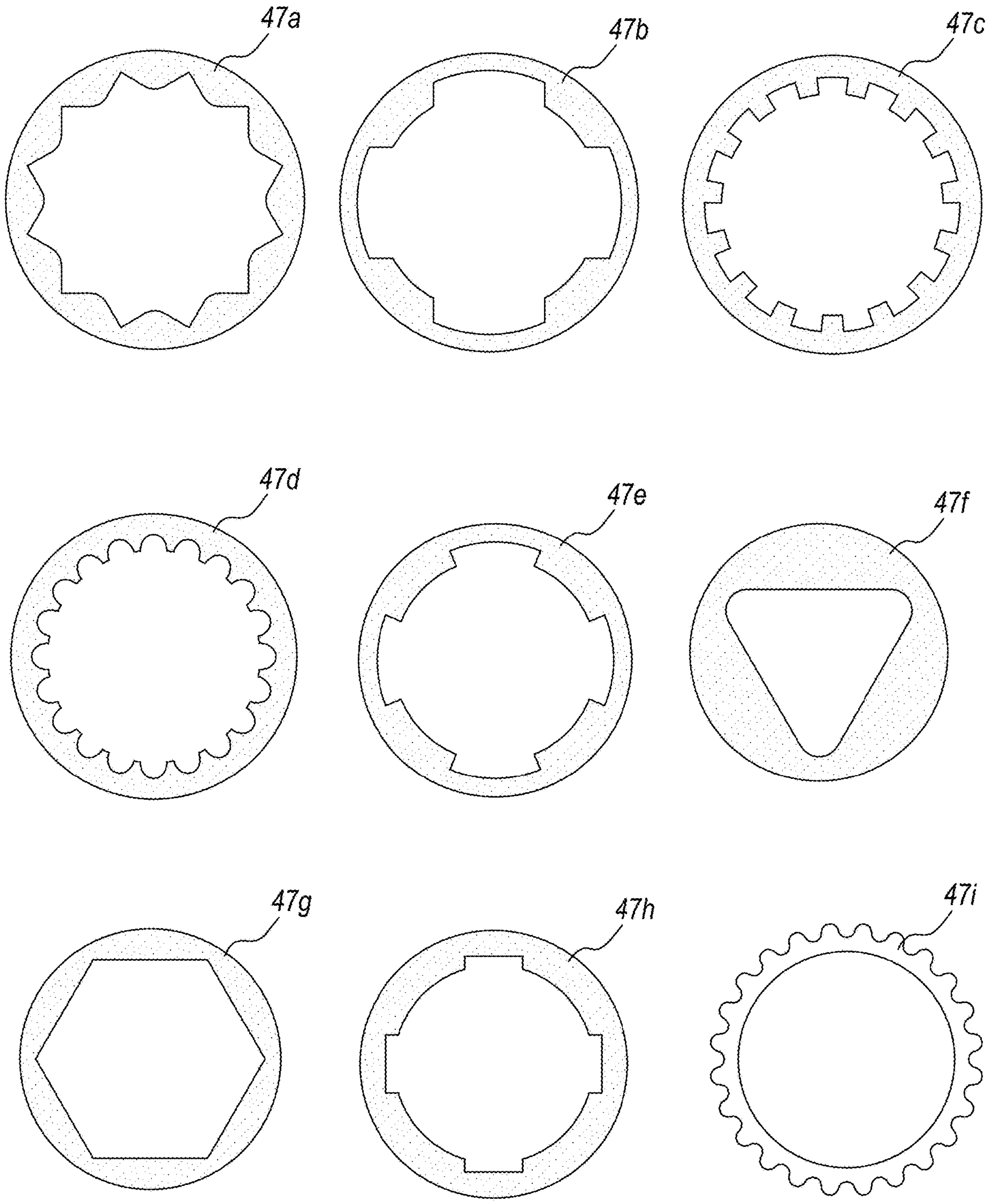
FIG. 34 depicts various structural features that may be implemented in a stiffened mating engagement of an anvil and a socket.

The engagement structure between the dynamically tuned socket and anvil has been primarily described and depicted as an involute spline with teeth that standard cutting tools in the industry can manufacture. A spline engagement is, therefore, desirable from the standpoint of both manufacturability and strength. However, there are alternatives that can also meet (or come close to meeting) the stiffness, inertial, and durability necessities pertinent to dynamically tuned impact wrench drive components. For example, FIG. 34 depicts several different engagement structures that may afford functionally operable stiffness when the corresponding structures of the tuned anvil and socket are connected. Features such as a triple square 47*a*, a stub tooth spline 47*b*, square teeth 47*c*, arc teeth, 47*d*, radial slots 47*e*, tri-lobes, 47*f*, hex indents 47*g*, and keys and key ways, 47*h*, may all provide sufficient structural functionality to comport with the optimal design characteristics revealed through dynamic tuning. Moreover, what has been depicted and described herein may apply to the socket side or anvil side. In other words, the anvil can include an external mating shape or an internal mating shape. An internal shape offers some advantages, because external structure can be utilized to maximize the amount of inertia that can exist on the anvil. However, an external mating structure on the anvil, such as external spline 47*i*, can be designed to meet the tuned stiffness requirements and may be as, or almost as, effective from the standpoint of part performance While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A power tool assembly comprising:

a housing configured to house a motor;

a drive system including:

a hammer assembly, the hammer assembly including a hammer configured to be driven by the motor;

an anvil having an anvil jaw, the anvil jaw being periodically engaged by the hammer as the hammer is being driven, the anvil further including:

a socket engagement portion located opposite the anvil jaw, the socket engagement portion having a cylindrical wall forming a generally cylindrical open cavity and including interior splines disposed along an inner surface of the cylindrical wall; and a socket having a generally cylindrical first end and a second end, the socket first end defining an anvil engagement portion configured to be removably fitted directly into the open cavity of the socket engagement portion, the anvil engagement portion including exterior splines configured to engage with the interior splines of the socket engagement portion, the socket second end configured to receive a fastener opposite the anvil engagement portion;

wherein the interior splines and the exterior splines provide stiffness between the anvil and the socket, and a total inertia of the drive system is split between the inertia of the hammer, the inertia of the anvil, and the inertia of the socket, and wherein an inertia ratio is decreased as a stiffness ratio increases, where the inertia ratio is the ratio of the combined inertias of the anvil and the socket to the inertia of the hammer assembly, and where the stiffness ratio is the ratio of the combined stiffness of the anvil and the socket to the stiffness of the fastener.

2. The power tool assembly of claim 1, wherein the interior splines and the exterior splines are selected from a group consisting of an involute spline, a triple square, a stub tooth spline, square teeth, arc teeth, radial slots, tri-lobes, hex indents, and keys and keyways.

3. The power tool assembly of claim 1, wherein the inertia ratio is between about 1.0 and about 2.0.

4. The power tool assembly of claim 3, wherein the stiffness ratio is between about 0.25 and about 0.75.

5. The power tool assembly of claim 1, wherein the hammer is a ball-and-cam type hammer.

6. The power tool assembly of claim 5, wherein the inertia ratio is between about 0.75 and about 1.0.

7. The power tool assembly of claim 6, wherein the stiffness ratio is between about 1.05 and about 1.55.

8. The power tool assembly of claim 7, wherein the stiffness ratio is about 1.33.

9. The power tool assembly of claim 1, wherein the socket engagement portion is integral to the anvil.

10. A drive system of an impact wrench comprising:

a hammer assembly, the hammer assembly having a hammer configured to be driven by the motor;

an anvil having an anvil jaw, the anvil jaw being periodically engaged by the hammer as the hammer is being driven, the anvil further including:

a socket engagement portion located opposite the anvil jaw, the socket engagement portion having a cylindrical wall forming a generally cylindrical open cavity and including interior splines disposed along an inner surface of the cylindrical wall; and a socket having a generally cylindrical first end and a second end, the socket first end having a first diameter and defining an anvil engagement portion configured to be removably fitted directly into the open cavity of the socket engagement portion, the anvil engagement portion having exterior splines configured to engage with the interior splines of the socket engagement portion, the socket second end having a second diameter configured to receive a fastener opposite the anvil engagement portion;

wherein the interior splines and the exterior splines provide stiffness between the anvil and the socket, and the total inertia of the drive system is divided between the inertia of the hammer, the inertia of the anvil, and the inertia of the socket, and wherein an inertia ratio is decreased as a stiffness ratio increases, where the inertia ratio is the ratio of the combined inertias of the anvil and the socket to the inertia of the hammer assembly, and where the stiffness ratio is the ratio of the combined stiffness of the anvil and the socket to the stiffness of the fastener.

11. The drive system of claim 10, wherein the interior splines and the exterior splines are selected from a group consisting of an involute spline, a triple square, a stub tooth spline, square teeth, arc teeth, radial slots, tri-lobes, hex indents, and keys and keyways.

12. The drive system of claim 10, wherein the inertia ratio is between about 1.0 and about 2.0.

13. The drive system of claim 12, wherein the stiffness ratio is between about 0.25 and about 0.75.

14. The drive system of claim 10, wherein the hammer is a ball-and-cam type hammer.

15. The drive system of claim 14, wherein the inertia ratio is between about 0.75 and about 1.0.

16. The drive system of claim 15, wherein the stiffness ratio is between about 1.05 and about 1.55.

17. The drive system of claim 16, wherein the stiffness ratio is about 1.33.

18. The drive system of claim 10, wherein the socket engagement portion is integral to the anvil.

* * * * *